US011547265B2

(12) United States Patent
Kim et al.

(10) Patent No.: US 11,547,265 B2
(45) Date of Patent: *Jan. 10, 2023

(54) CLEANING ROBOT

(71) Applicant: LG Electronics Inc., Seoul (KR)

(72) Inventors: Hanshin Kim, Seoul (KR); Kyuchun Choi, Seoul (KR); Jungmin Shim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 410 days.

This patent is subject to a terminal disclaimer.

(21) Appl. No.: 16/847,931

(22) Filed: Apr. 14, 2020

(65) Prior Publication Data

US 2020/0237174 A1 Jul. 30, 2020

Related U.S. Application Data

(63) Continuation of application No. 15/861,347, filed on Jan. 3, 2018, now Pat. No. 10,646,090.

(30) Foreign Application Priority Data

Jan. 4, 2017 (KR) ........................ 10-2017-0001610

(51) Int. Cl.
| | |
|---|---|
| *B25J 9/00* | (2006.01) |
| *A47L 9/28* | (2006.01) |
| *G01S 17/931* | (2020.01) |
| *A47L 11/40* | (2006.01) |
| *B25J 9/16* | (2006.01) |

(Continued)

(52) U.S. Cl.
CPC ......... *A47L 11/4011* (2013.01); *A47L 9/0411* (2013.01); *A47L 9/2826* (2013.01); *A47L 11/4013* (2013.01); *A47L 11/4044* (2013.01); *B25J 9/0003* (2013.01); *B25J 9/1697* (2013.01); *G01S 7/4813* (2013.01); *G01S 17/931* (2020.01); *G05D 1/024* (2013.01); *G05D 1/0227* (2013.01); *A47L 2201/04* (2013.01); *A47L 2201/06* (2013.01); *G05D 2201/0203* (2013.01)

(58) Field of Classification Search
CPC .. A47L 11/4011; A47L 9/0411; A47L 9/2826; A47L 11/4013; A47L 11/4044; A47L 2201/04; A47L 2201/06; A47L 9/2852; A47L 9/2805; A47L 9/2847; A47L 9/2894; A47L 9/30; B25J 9/0003; B25J 9/1697; B25J 11/0085; B25J 5/007; B25J 9/0009; B25J 19/0075; B25J 19/0091; B25J 19/02; G01S 7/4813; G01S 17/931; G05D 1/0227; G05D 1/024; G05D 2201/0203
See application file for complete search history.

(56) References Cited

U.S. PATENT DOCUMENTS

| | | | |
|---|---|---|---|
| 10,646,090 B2* | 5/2020 | Kim | G05D 1/024 |
| 10,653,282 B2* | 5/2020 | Song | B25J 9/1694 |

(Continued)

*Primary Examiner* — David Redding
(74) *Attorney, Agent, or Firm* — Birch, Stewart, Kolasch & Birch, LLP

(57) ABSTRACT

A cleaning robot includes a top cover, a bottom cover formed below the top cover and configured to move by external force, a fixed body provided in the bottom cover, a first opening formed in an upper portion of the bottom cover and a first sensor connected to the fixed body and externally exposed between the top cover and the bottom cover through the first opening.

20 Claims, 14 Drawing Sheets

(51) Int. Cl.
    *A47L 9/04*            (2006.01)
    *G05D 1/02*           (2020.01)
    *G01S 7/481*          (2006.01)

(56) References Cited

U.S. PATENT DOCUMENTS

| | | |
|---|---|---|
| 2004/0117064 A1 | 6/2004 | McDonald |
| 2007/0061040 A1 | 3/2007 | Augenbraun et al. |
| 2007/0186522 A1 | 8/2007 | Hato |
| 2014/0257563 A1 | 9/2014 | Park et al. |

\* cited by examiner

CLEANING ROBOT

CROSS-REFERENCE TO RELATED APPLICATIONS

This application is a continuation of U.S. application Ser. No. 15/861,347, filed Jan. 3, 2018, which claims priority under 35 U.S.C. 119 to Korean Patent Application No. 10-2017-0001610, filed on Jan. 4, 2017 in the Korean Intellectual Property Office, the disclosures of all of which are incorporated herein by reference.

FIELD

The present invention relates to a traveling device, and more particularly, to a robot for performing various operations while traveling about a specific place.

BACKGROUND

Recently, with development of autonomous traveling technology and automatic control technology, functions of a traveling device and, more particularly, a robot have been increased.

Each technology will now be described. Autonomous traveling technology refers to technology for enabling a machine to autonomously move to avoid an obstacle. According to autonomous traveling technology, a robot autonomously recognizes a position thereof through a sensor and moves to avoid an obstacle.

Automatic control technology refers to technology for enabling a machine to feed values measured by examining the state of the machine back to a control device to automatically control operation of the machine. Accordingly, the machine can be controlled without human manipulation and can be automatically controlled to be positioned within a target range, that is, to reach a target point.

With development and combination of the above-described technologies, an intelligent robot can be implemented and a variety of information and services can be provided through the intelligent robot.

The robot is generally applicable to industrial fields, medical fields, space-related fields and ocean-related fields. For example, a robot may perform repeated operation in machining processes such as automobile production. That is, when a person inputs an operation to be performed, industrial robots repeat the received operation.

In addition, technology for mounting a camera in a robot was conventionally implemented. A robot may recognize a position thereof or an obstacle using a camera. In addition, a captured image can be displayed on a display unit.

SUMMARY

An object of the present embodiment is to provide a cleaning robot including a lidar sensor externally exposed to perform sensing, which is capable of protecting the lidar sensor from direct collision with an external obstacle without a light-transmission protective film.

Another object of the present embodiment is to provide a cleaning robot capable of preventing an externally exposed lidar sensor from being damaged due to collision between the lidar sensor and a cover, when the cover configuring appearance of the cleaning robot and serving as a bumper moves by external force.

According to an aspect of the present embodiment, a cleaning robot may include a fixed body provided in a bottom cover and a lidar sensor connected to the fixed body. The lidar sensor may be externally exposed through an opening formed in an upper portion of the bottom cover. A top cover may be located above the bottom cover and the lidar sensor may be located between the top cover and the bottom cover.

In some embodiments, the cleaning robot may include a recessed part formed between the top cover and the bottom cover, and the opening may be located in the recessed part such that the lidar sensor may be externally exposed in the recessed part.

According to another aspect of the present invention, a circumference of an opening and a lidar sensor are spaced apart from each other by a predetermined distance and the predetermined distance may be equal to or greater than a maximum movement distance of a bottom cover. In some embodiments, a fixed body of the cleaning robot may include a cover stopper spaced apart from the bottom cover by a predetermined distance, and the cover stopper may be brought into contact with the bottom cover according to movement of the bottom cover.

According to another aspect of the present invention, a cleaning robot includes a movement frame fastened to a bottom cover and an elasticity setting part configured to support the movement frame relative to a fixed body to move within a predetermined distance. In this case, a distance between a circumference of the opening and the lidar sensor may be greater than the predetermined distance.

Accordingly, a cleaning robot according to the invention may include a fixed body, a traveling part provided at a lower portion of the fixed body to enable the cleaning robot to move along a floor surface, a suction part provided at the fixed body to suck foreign materials from the floor surface, a cover surrounding the fixed body, the cover being configured to move horizontally in response to an external force, a first opening provided in an upper portion of the cover, and a first sensor connected to the fixed body and exposed externally of the cover through the first opening.

The traveling part may include a plurality of wheels.

An edge of the first opening may be spaced apart from the first sensor by a predetermined distance, and the predetermined distance may be equal to or greater than a maximum movement distance of the cover.

The fixed body may further include a cover stopper spaced apart from the cover by the predetermined distance, wherein the cover is brought into contact with the cover stopper upon a maximum movement amount of the cover.

The cover may include a top cover and a bottom cover, wherein a first recessed part recessed inward from a front side of the cleaning robot is provided between the top cover and the bottom cover, and wherein the first opening is located in the bottom cover and within the first recessed part.

The bottom cover may further include an inner wall located within the first recessed part, wherein the inner wall is brought into contact with the cover stopper according to a maximum movement amount of the bottom cover.

The first recessed part may extend along a front side and a portion of both lateral sides of the cleaning robot.

The cover may include a top cover and a bottom cover, wherein a second recessed part recessed inward from a rear side of the cleaning robot is provided between the top cover and the bottom cover, and wherein the second opening is located in the bottom cover and within the second recessed part. The second recessed part may extend along a rear side to both lateral sides of the cleaning robot. The second recessed part may be located vertically higher than the first recessed part, and the second sensor may be located vertically higher than the first sensor. The first sensor and the second sensor may include lidar sensors.

An edge of the first opening may be spaced apart from the first sensor by a first distance, wherein the fixed body further includes a cover stopper spaced apart from the cover by a second distance, wherein the first distance is greater than the second distance, and whereby the cover is brought into contact with the cover stopper upon a maximum movement amount of the cover to prevent the cover from contacting the first sensor.

The cleaning robot may include a side brush protruding from a front lower end of the cover.

The cleaning robot may include a second opening provided in an upper portion of the cover, and a second sensor connected to the fixed body and exposed externally of the cover through the second opening, wherein an edge of the first opening is spaced apart from the first sensor by a first distance, and wherein an edge of the second opening is spaced apart from the second sensor by a second distance.

The cleaning robot may include a movement frame supporting the cover, the movement frame being movable horizontally with respect to the fixed body, and an elasticity setting part provided between the movement frame and the fixed body to support the movement frame relative to the fixed body, and to permit limited horizontal movement of the cover with respect to the fixed body.

The elasticity setting part may include an inner body provided below the movement frame, and a holder providing a reception space for receiving the inner body, wherein the inner body is movable within the reception space. The elasticity setting part may further include a movement shaft connecting the movement frame to the inner body, and a movement-shaft stopper provided above the holder, wherein the movement shaft passes through the movement-shaft stopper and is movable within the movement-shaft stopper. The elasticity setting part may include a first elastic member connected between the movement frame and the fixed body for biasing the movement frame in a first direction, and a second elastic member connected between the movement frame and the fixed body for biasing the movement frame in a second direction.

Also, a cleaning robot according to the invention may include a fixed body, a plurality of wheels provided at a lower portion of the fixed body to enable the cleaning robot to move along a floor surface, a suction part provided at the fixed body to suck foreign materials from the floor surface, a cover surrounding the fixed body, the cover being configured to move horizontally in response to an external force, a first opening provided in a first upper portion of the cover, a second opening provided in a second upper portion of the cover, a first lidar sensor connected to the fixed body and exposed externally of the cover through the first opening, the first opening having an edge spaced apart from the first lidar sensor by a first distance, a second lidar sensor connected to the fixed body and exposed externally of the cover through the second opening, the second opening having an edge spaced apart from the second lidar sensor by a second distance, and a cover stopper provided on the fixed body, the cover stopper being spaced apart from the cover by a third distance, wherein the third distance is less than the first distance and less than the second distance, whereby the cover is brought into contact with the cover stopper upon a maximum movement amount of the cover to prevent the cover from contacting the first lidar sensor or the second lidar sensor.

Finally, a cleaning robot according to the invention may include a fixed body, a plurality of wheels provided at a lower portion of the fixed body to enable the cleaning robot to move along a floor surface, a suction part provided at the fixed body to suck foreign materials from the floor surface, a cover surrounding the fixed body, the cover being configured to move horizontally in response to an external force, a first opening provided in a first upper portion of the cover, a second opening provided in a second upper portion of the cover, a first sensor connected to the fixed body and exposed externally of the cover through the first opening, the first opening having an edge spaced apart from the first sensor by a first distance, a second sensor connected to the fixed body and exposed externally of the cover through the second opening, the second opening having an edge spaced apart from the second sensor by a second distance, a movement frame supporting the cover, the movement frame being movable horizontally with respect to the fixed body, an elasticity setting part provided between the movement frame and the fixed body to support the movement frame relative to the fixed body, and to permit limited movement of the cover with respect to the fixed body. The elasticity setting part may include an inner body provided below the movement frame, a holder providing a reception space for receiving the inner body, the inner body being movable within the reception space, a movement shaft connecting the movement frame to the inner body, a movement-shaft stopper provided above the holder, the movement shaft passing through the movement-shaft stopper and being movable within the movement-shaft stopper, a first elastic member connected between the movement frame and the fixed body for biasing the movement frame in a first direction, and a second elastic member connected between the movement frame and the fixed body for biasing the movement frame in a second direction.

DETAILED DESCRIPTION OF THE PREFERRED EMBODIMENT

A traveling device refers to a device which can move from a specific position to another position using power. The traveling device may be divided into an automatic traveling device and a manual traveling device. The automatic traveling device may refer to a traveling device which autonomously travels along a predetermined path without user manipulation. As an example of the traveling device, there is a movable robot. The movable robot may perform various operations while moving using traveling parts, e.g., wheels or legs.

For convenience of description, in this specification, the present invention will be described using a cleaning robot. The cleaning robot may mean a robot for performing a cleaning operation while moving about a specific region. For example, the cleaning robot may include an airport cleaning robot for performing a cleaning operation while moving about a wide space such as an airport.

The present invention is not limited to the cleaning robot and is applicable to a traveling device including a cleaning robot.

Figure 1:
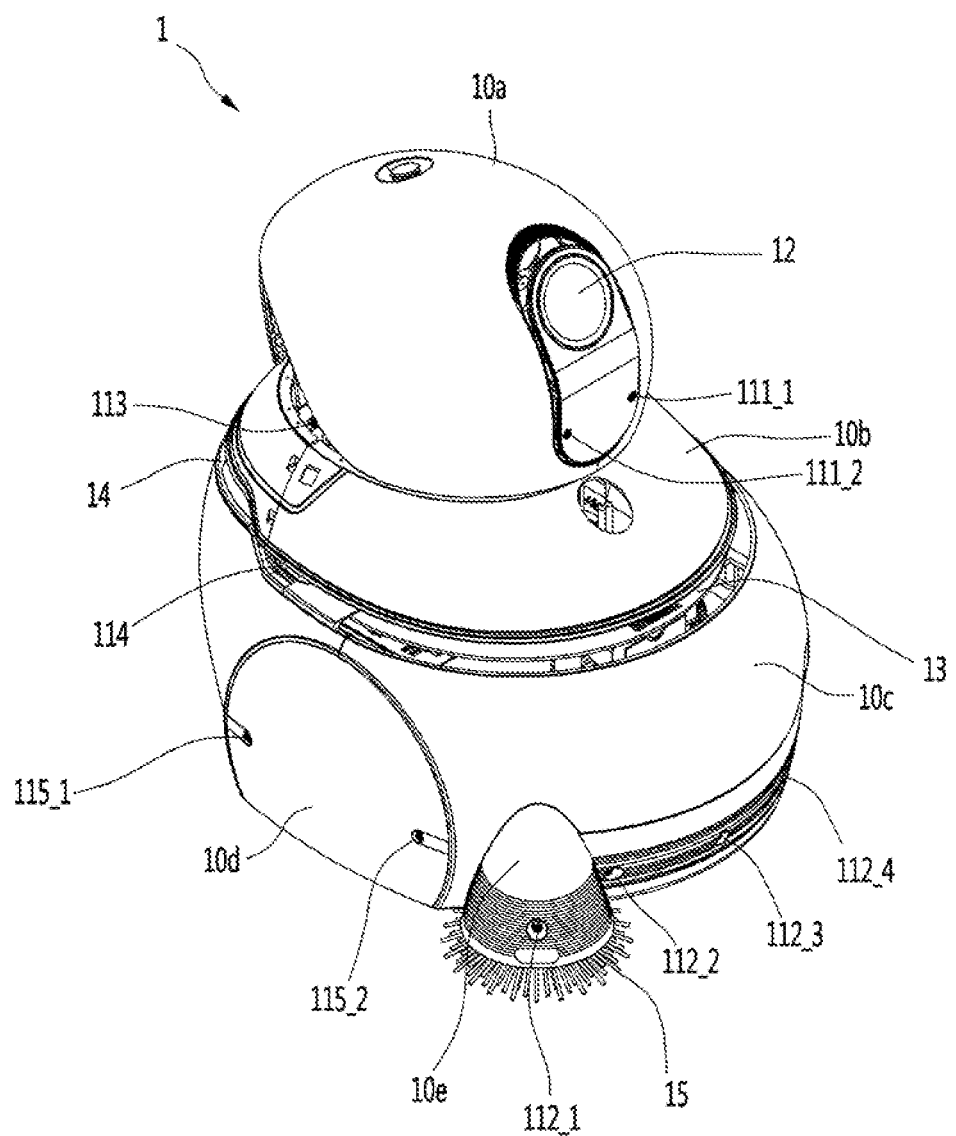
FIG. 1 is a diagram showing the appearance of a cleaning robot according to an embodiment of the present invention.

FIG. 1 is a diagram showing the appearance of a cleaning robot according to an embodiment of the present invention.

Figure 2:
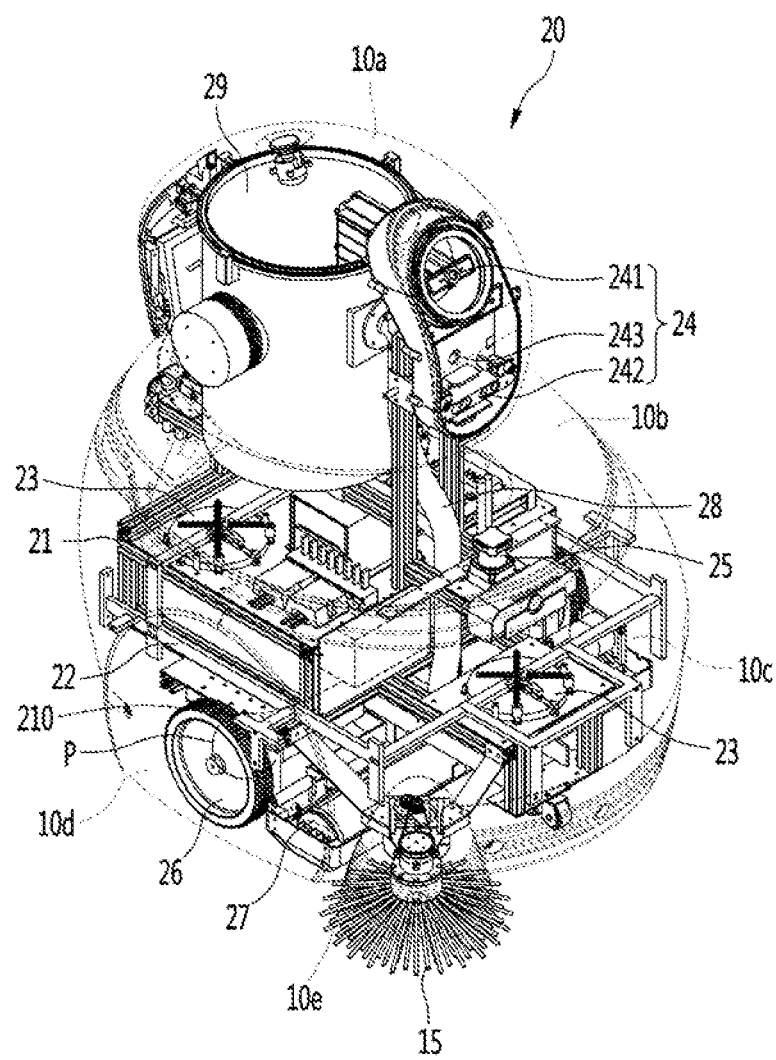
FIG. 2 is a perspective view showing a main body provided in a cleaning robot according to an embodiment of the present invention.

Referring to FIG. 1, the cleaning robot 1 includes covers 10a, 10b, 10c, 10d and 10e (collectively, 10) covering various components provided in a main body 20 (see FIG. 2). The cover 10 surrounds the outside of the main body 20 to form the appearance of the cleaning robot 1.

For example, the cover 10 may include a top cover 10a, a middle cover 10b provided below the top cover 10a and a bottom cover 10c provided below the middle cover 10b. The top cover 10a, the middle cover 10b and the bottom cover 10c may be integrally formed as one cover or may be separately formed as separate covers.

The top cover 10a may be located at the uppermost end of the cleaning robot 1. For example, the top cover 10a may be formed in a dome shape, without being limited thereto. The top cover 10a may include a light transmission unit 12 for enabling at least one camera provided in the main body 20 to capture the periphery (e.g., the front side) of the cleaning robot 1. The light transmission unit 12 may be placed at one side of a front surface of the top cover 10a. The light transmission unit 12 may be made of a material for transmitting light, such as glass, plastic, acryl, etc., without being limited thereto. The at least one camera may collect light reflected from objects located near the cleaning robot 1 and received through the light transmission unit 12, thereby capturing the objects located near the cleaning robot 1. The top cover 10a may be located at a height where the at least one camera can recognize the user's face or more accurately recognize the current position of the cleaning robot. For example, the top cover 10a may be located at a height (e.g., about 140 cm) less than the height of an adult.

The middle cover 10b may be provided below the top cover 10a. The width of the middle cover 10b may be gradually increased from the upper side to the lower side thereof. For example, if the middle cover 10b has a cylindrical shape, the diameter of the middle cover 10b may be increased from the upper side to the lower side thereof. In some embodiments, the middle cover 10b may be included in the top cover 10a. In this case, the cover 10 may be divided into a top cover (or a first cover) and a bottom cover (or a second cover) with respect to recessed parts 13 and 14.

The bottom cover 10c may be provided below the middle cover 10b. The bottom cover 10c may have a greater width than the top cover 10a and the middle cover 10b.

A battery, traveling parts (e.g., wheels), various boards (e.g., printed circuit boards (PCBs)), etc., may be received in the bottom cover 10c. In some embodiments, the bottom cover 10c may be formed to surround the outsides of the traveling parts 26 (see FIG. 2). In another embodiment, the bottom cover 10c may include traveling-unit covers 10d surrounding the outsides of the traveling parts 26. In another embodiment, if a side brush 15 protruding to a front lower end of the cleaning robot 1 is provided, the bottom cover 10c may be formed to surround the outside of the side brush 15. In some embodiments, the bottom cover 10c may further include a side-brush cover 10e surrounding the outside of the side brush 15.

The cover 10 may include a plurality of sensors 111_1 to 115_2 (collectively referred to as a sensor unit 11) for sensing whether an object is present within a predetermined distance from the cleaning robot 1. The sensor unit 11 may be provided at various positions of the top cover 10a, the middle cover 10b and the bottom cover 10c.

Meanwhile, the cover 10 may include a first recessed part 13 and a second recessed part 14. The first recessed part 13 and the second recessed part 14 may be recessed from the outside of the cover 10 to the inside of the robot. For example, the first recessed part 13 may be recessed inward from the front side of the cleaning robot 1 between the top cover 10a (or the middle cover 10b) and the bottom cover 10c. In addition, the second recessed part 14 may be recessed inward from the rear side of the cleaning robot between the top cover 10a (or the middle cover 10b) and the bottom cover 10c.

The first recessed part 13 may horizontally extend from the front side to both lateral sides of the cleaning robot 1. In some embodiments, the first recessed part 13 horizontally extending from the front side to both lateral sides of the cleaning robot may extend to the rear side of the side surface of the cleaning robot beyond the center of the side surface of the cleaning robot 1. In this case, the angle of the surface in which the first recessed part 13 is formed may exceed 180° (e.g., 270°).

The second recessed part 14 may horizontally extend from the rear side to both lateral sides of the cleaning robot 1. For example, the angle of the surface in which the second recessed part 14 is formed may be 180°, without being limited thereto.

The top cover 10a and the middle cover 10b are positioned above the first recessed part 13 and the second recessed part 14 and the bottom cover 10c may be positioned below the first recessed part 13 and the second recessed part 14. In some embodiments, an inner wall may be vertically formed in the first recessed part 13 and the second recessed part 14. In some embodiments, the inner wall may connect the middle cover 10b (or the top cover) and the bottom cover 10c to each other.

A lidar sensor 25 (see FIG. 2) may be located in each of the first recessed part 13 and the second recessed part 14. The lidar sensor 25 may be exposed in a horizontal direction but may not be exposed in a vertical direction. Therefore, direct collision between an external obstacle and the lidar sensor 25 can be reduced. The lidar sensor 25 will be described in greater detail with reference to the following drawings.

Figure 3:
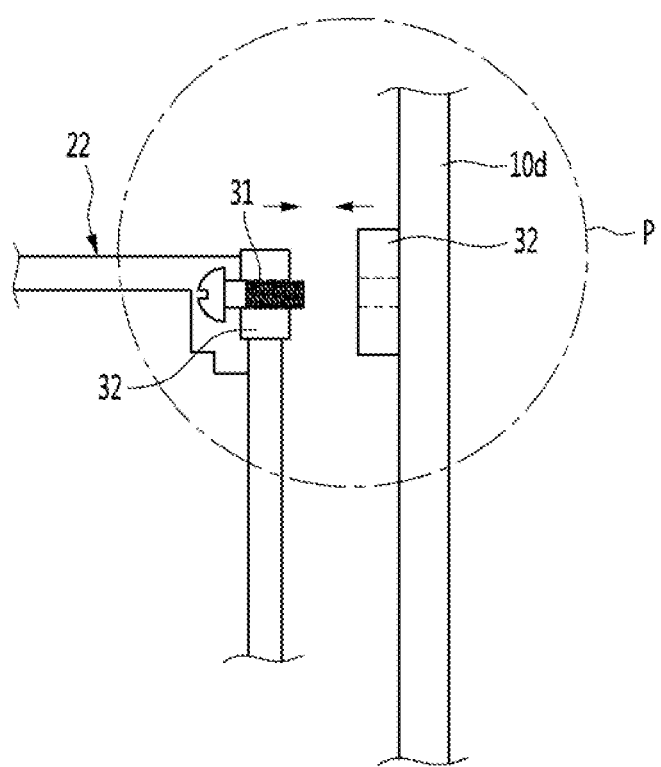
FIG. 3 is a diagram showing an example of a fastening structure between a cover and a movement frame of a cleaning robot according to an embodiment of the present invention.

FIG. 2 is a perspective view showing a main body provided in a cleaning robot according to an embodiment of the present invention, and FIG. 3 is a diagram showing an example of a fastening structure between a cover and a movement frame of a cleaning robot according to an embodiment of the present invention.

Referring to FIGS. 2 and 3, the main body 20 of the cleaning robot 1 may include a fixed body 21, a movement frame 22, one or more elasticity setting parts 23, a lidar sensor 25, and traveling parts 26. The components shown in FIG. 2 are not essential in implementation of the main body 20 of the cleaning robot 1. Accordingly, the main body 20 of the cleaning robot 1 described in this specification may have more or fewer components than the above-described components.

Specifically, among the above-described components, the fixed body 21 may be connected to various parts necessary for operation of the cleaning robot 1 and the other components. In this specification, the fixed body 21 may be a frame configuring the main body 20. The fixed body 21 may be received in the bottom cover 10*c*. That is, the cover 10 may be formed to surround the outside of the fixed body 21.

The fixed body 21 may include various boards for controlling overall operation of the cleaning robot 1. For example, the fixed body 21 may include some or all of a main board for managing overall driving of the cleaning robot 1, a board for processing data collected through the sensor unit 11, the camera unit 24 and the lidar sensor 25 and/or a board for controlling operation for supplying power of the battery 210 to the components included in the cleaning robot 1. The battery 210 for supplying power necessary for operation of the cleaning robot 1 may be received in the fixed body 21.

In addition, the fixed body 21 may be connected to various components (e.g., a lidar sensor 25 and the traveling unit 26) necessary for operation of the cleaning robot 1. The detailed structure of the fixed body 21 will be described below with reference to FIG. 4.

The movement frame 22 is provided between the cover 10 and the fixed body 21 to support the cover 10 movably relative to the fixed body 21. The movement frame 22 may be fastened to at least one point P of the cover 10 to support the cover 10 relative to the fixed body 21 while moving according to movement of the cover 10. For example, as shown in FIG. 3, the cover 10 (e.g., traveling-unit cover 10*d*) located at a fastening point P or the movement frame 22 may include a fastening boss 32 such that the cover 10 and the movement frame 22 are fastened to each other by a fastening screw 31 and the fastening boss 32. In some embodiments, the cover 10 or the movement frame 22 may include a plurality of fastening bosses such that the cover 10 and the movement frame 22 are fastened to each other at a plurality of points. The method of fastening the cover 10 and the movement frame 22 is not limited to the embodiment shown in FIG. 3 and various fastening methods may be used.

As described above with reference to FIG. 1, if the cover 10 includes the top cover 10*a*, the middle cover 10*b* and the bottom cover 10*c* (the bottom cover 10*c* includes the traveling-unit cover 10*d*), the movement frame 22 may be fastened to the bottom cover 10*c* and may not be fastened to the top cover 10*a* and the middle cover 10*b*. Accordingly, the movement frame 22 may move based on movement of the bottom cover 10*c*. However, in some embodiments, the movement frame 22 may be fastened to the top cover 10*a* or the middle cover 10*b* and, in this case, the movement frame 22 may move based on movement of the top cover 10*a* or the middle cover 10*b*.

In addition, the movement frame 22 may be connected to the fixed body 21 through the one or more elasticity setting parts 23 and, at the same time, may be supported relative to the fixed body 21. That is, since the movement frame 22 and the cover 10 are connected to the fixed body 21 through the elasticity setting parts 23, the elasticity setting parts 23 may be provided as fasteners between the cover 10 and the fixed body 21.

The one or more elasticity setting parts 23 may minimize delivery of external force to the fixed body 21 using an elastic member (e.g., a spring, etc.) having elastic force, even when the cover 10 and the movement frame 22 are moved by external force. That is, the elastic member may absorb external force applied to the cover 10 as elastic deformation. Accordingly, even when the cover 10 and the movement frame 22 are moved by external force, the fixed body 21 is not moved, thereby preventing various components connected or fixed to the fixed body 21 from being damaged or broken. In particular, since the elastic setting parts 23 are fixed to the fixed body 21 including a component having a large weight, such as the battery 210, the fixed body 21 may not be moved and only the elastic member may be stretched, upon applying external force.

In addition, the one or more elastic setting parts 23 may elastically support the movement frame 22 relative to the fixed body 21. That is, after the cover 10 and the movement frame 22 are moved by external force, the elastic setting parts 23 may return and fix the movement frame 22 to and at a reference position using elastic force.

According to the embodiment of FIG. 5 to be described later, the main body 20 may include a first elasticity setting part 23*a*, a second elasticity setting part 23*b*, and a third elasticity setting part 23*c* respectively provided at the front side and lateral rear sides of the fixed body 21. The first to third elasticity setting parts 23*a* to 23*c* provided in the fixed body 21 may be arranged in a triangular shape when viewed from the top of the cleaning robot 1. Accordingly, the cover 10 and the movement frame 22 may be stably supported relative to the fixed body 21 by the first to third elasticity setting parts 23*a* to 23*c*.

The lidar sensor 25 is a laser radar and may be a sensor for irradiating laser light, collecting and analyzing backwardly scattered light of light absorbed or scattered by an aerosol and recognizing an obstacle or a position of the cleaning robot. Although one lidar sensor 25 is provided at the front side of the fixed body 21 in FIG. 2, the lidar sensor 25 may also be provided at the rear side of the fixed body 21. In general, since a laser light has high straightness, the laser light emitted from the lidar sensor 25 may be irradiated onto one point of a horizontal position without dispersing upward and downward or from side to side.

The traveling parts 26 may be provided below the fixed body 21. For example, the traveling parts 26 may be connected to a lower fixed body 21*e* (referring to FIG. 4). Although wheels 26 are shown as an example of the traveling parts 26 in FIG. 2, the traveling parts 26 may include legs in another embodiment. In addition, although two wheels are provided at both sides of the cleaning robot in this specification, the number of wheels may be variously changed.

The wheels 26 rotate based on rotation force applied by a driving unit (not shown), such that the cleaning robot 1 travels. In some embodiments, a caster for aiding traveling of the cleaning robot 1 may be provided at the front or rear side of the cleaning robot 1.

In some embodiments, the cleaning robot 1 may further include a side brush 15 protruding to the front lower end of the cleaning robot, a camera unit 24 for capturing the front side of the cleaning robot 1, a suction module 27 for sucking in foreign materials on the ground, a cleaning module 29 for collecting the sucked foreign materials and a suction pipe 28 provided between the suction module 27 and the cleaning module 29. For example, the camera unit 24 may include a simultaneous localization and mapping (SLAM) camera 241, a red, green, blue, distance (RGBD) camera 242, and a stereo camera (or stereoscopic camera 243.The suction module 27 may further include a driving motor for rotating an agitator and a timing belt. The cleaning module 29 may include a dust collection motor and a dust collector.

Using the various components of the main body 20 described with reference to FIG. 2, the cleaning robot 1 may perform cleaning operation while freely moving about a region of a specific place (e.g., an airport, etc.).

As described above, various components are included in the main body 20 of the cleaning robot 1. The cover 10 (more particularly, the bottom cover 10c) forming the appearance of the cleaning robot 1 may serve as a bumper for protecting the various components included in the main body 20 from external impact (e.g., collision with an obstacle, external force, etc.) occurring at various positions or in various directions. In order for the bottom cover 10c to serve as a bumper, the movement frame 22 may be fastened to the bottom cover at at least one point and connected to and supported by the fixed body 21 at at least one point through the one or more elastic setting parts 23.

Hereinafter, the fixed body 21 provided in the main body 20 will be described in greater detail.

Figure 4:
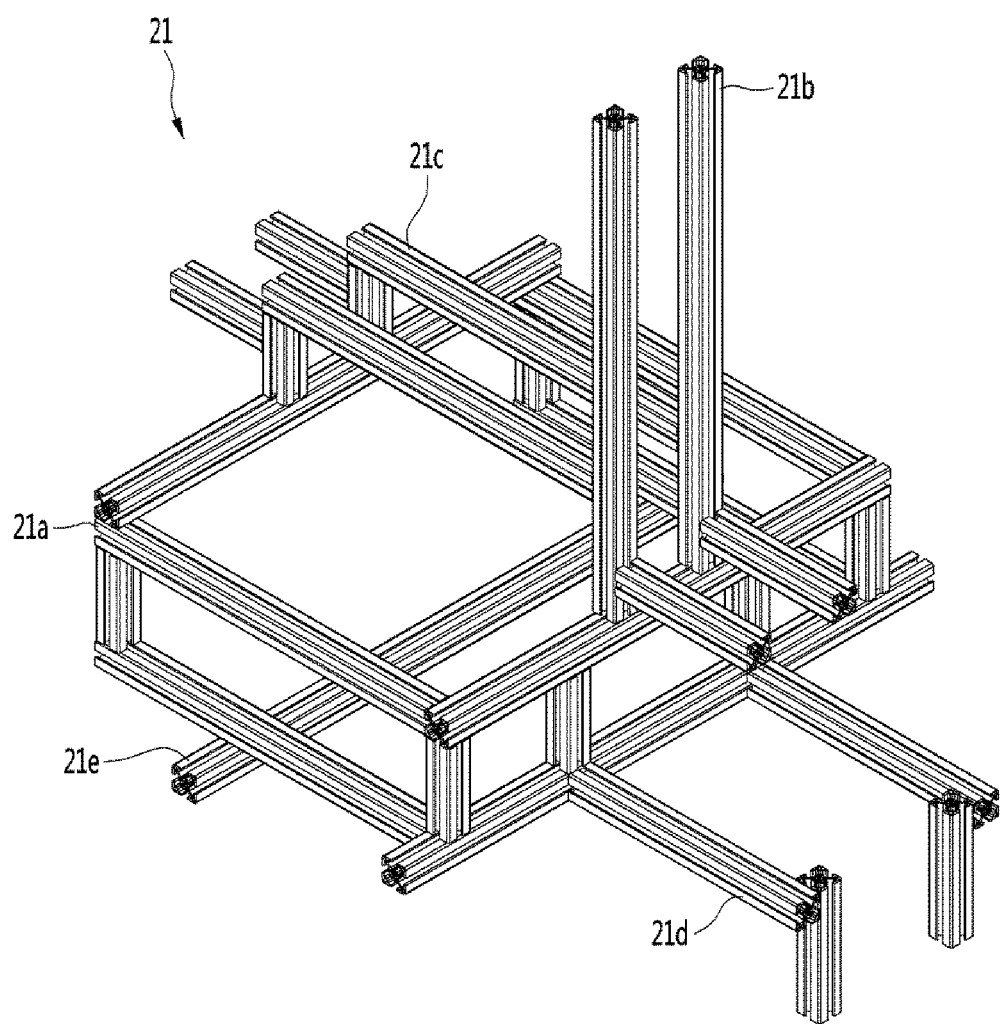
FIG. 4 is a diagram showing a fixed body included in a main body of a cleaning robot according to an embodiment of the present invention.

FIG. 4 is a perspective view showing a fixed body provided in a main body of a cleaning robot according to an embodiment of the present invention.

Referring to FIG. 4, the fixed body 21 may include a main fixed body 21a, a first upper fixed body 21b and a second upper fixed body 21c provided above the main fixed body 21a, a front fixed body 21d provided at the front side of the main fixed body 21a, and a lower fixed body 21e provided below the main fixed body 21a.

The main fixed body 21a may have a plurality of frames fastened to each other to form a three-dimensional structure having a predetermined volume and may form a basic frame of the main body 20. For example, as shown in FIG. 4, the main fixed body 21a may have a plurality of frames fastened to each other to have a rectangular parallelepiped shape but the shape of the main fixed body 21a is not limited to the rectangular parallelepiped shape. At least one plate may be fastened to the exterior of the main fixed body 21a and a battery 210 or a main board of the main body 20 may be provided in or above the main fixed body 21a.

The first upper fixed body 21b and the second upper fixed body 21c may be provided above the main fixed body 21a. The first upper fixed body 21b may include at least one frame extending in a longitudinal direction, and the second upper fixed body 21c may include at least one frame extending in a lateral direction toward the front and rear sides of the cleaning robot 1. For example, the camera unit 24 may be fixed to the first upper fixed body 21b toward the front side of the cleaning robot 1. In addition, the cleaning module 29 of FIG. 2 may be seated in the second upper fixed body 21c. In some embodiments, the cleaning module 29 may be fastened to the first upper fixed body 21b and the second upper fixed body 21c, thereby being more stably fixed.

The front fixed body 21d may be provided at the front side of the main fixed body 21a. A second plate 212, to which an elastic setting part 23a described below with reference to FIG. 5 may be fastened, may be fastened to the front fixed body 21d. In some embodiments, a caster assisting traveling of the traveling parts 26 may be fastened to the lower part of the front fixed body 21d.

The lower fixed body 21e may be provided below the main fixed body 21a. The lower fixed body 21e may include at least one frame extending in a lateral direction toward both lateral sides of the cleaning robot 1. The traveling parts 26 and the suction module 27 may be fastened to the lower fixed body 21e. In some embodiments, the suction module 27 may be fastened to at least one of the main fixed body 21a, the front fixed body 21d and, the lower fixed body 21e.

Figure 5:
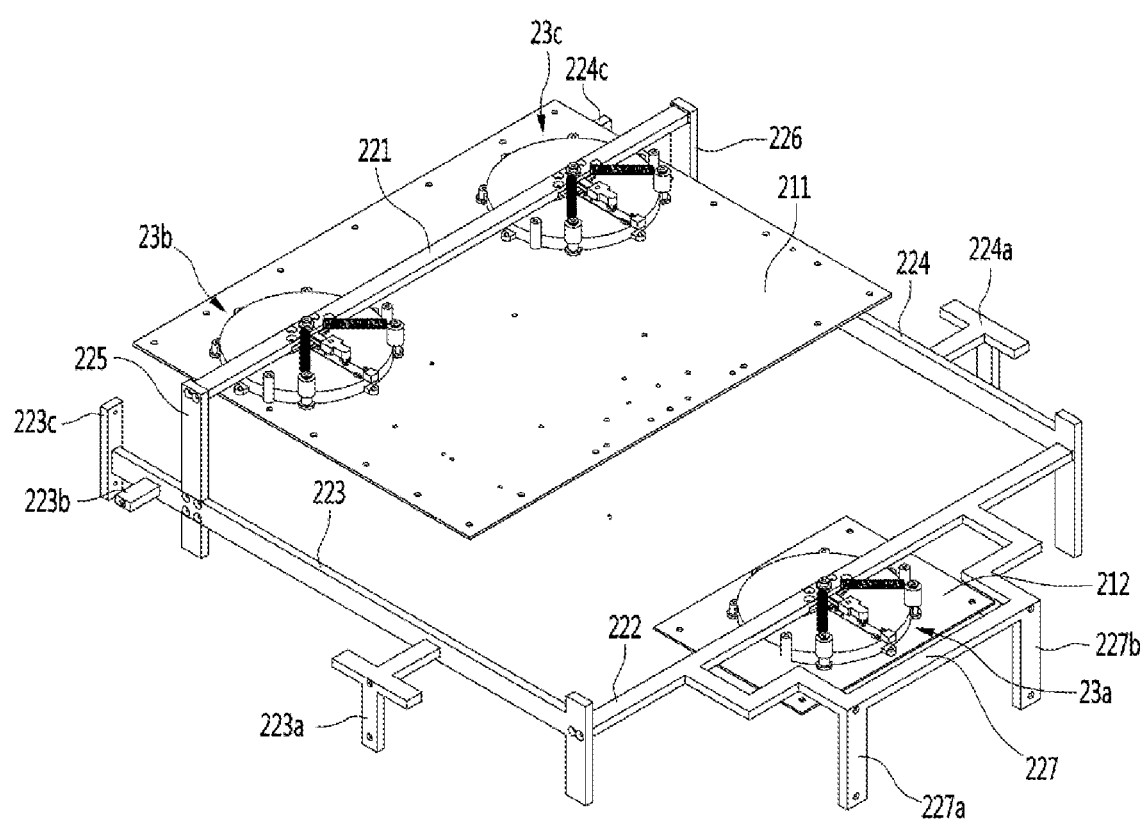
FIG. 5 is a perspective view showing a movement frame and components for fixing the movement frame to a fixed body of a cleaning robot according to an embodiment of the present invention.
Figure 6:
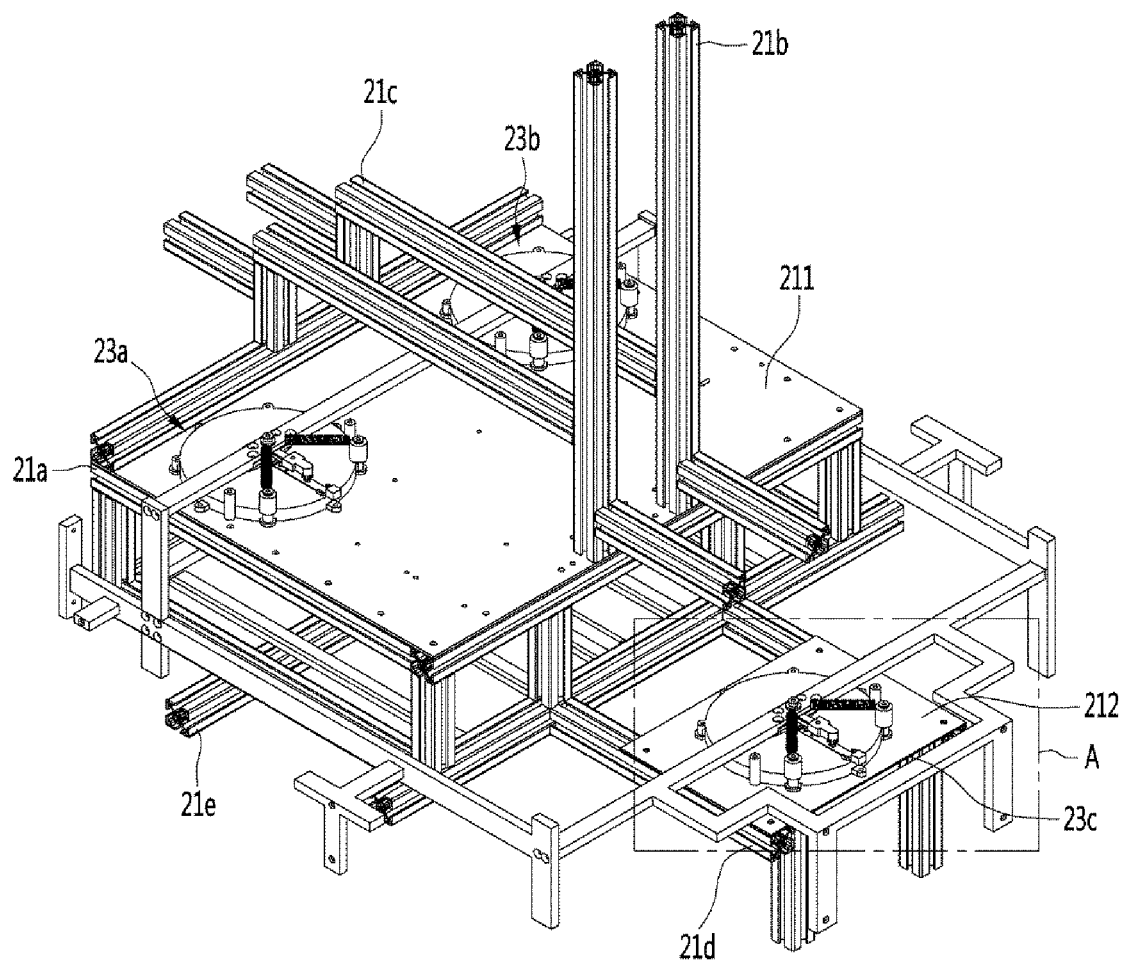
FIG. 6 is a diagram showing a movement frame and a fixed body.

FIG. 5 is a perspective view showing a movement frame and components for fixing the movement frame to a fixed body of a cleaning robot according to an embodiment of the present invention, and FIG. 6 is a perspective view showing a movement frame and a fixed body.

Referring to FIG. 5, the movement frame 22 may include a plurality of frames adjacent to the inner circumferential surface of the cover 10 (e.g., the bottom cover 10c) and located at front, rear and both lateral sides of the center of the cleaning robot 1. For example, the movement frame 22 may include a first frame 221 and a second frame 222 extending in a lateral direction toward both lateral sides of the cleaning robot 1 and a third frame 223 and a fourth frame 224 extending in a lateral direction toward the front and rear sides of the cleaning robot 1. For example, the first frame 221 may be located above the main fixed body 21a, and the second frame 222 may be located at the front side of the main fixed body 21a. In addition, the third frame 223 and the fourth frame 224 may be located at both lateral sides of the main fixed body 21a. In this case, although the movement frame 22 has a rectangular shape when viewed from the top, the shape of the movement frame 22 is not limited thereto.

In some embodiments, based on the arrangements of various components received in the bottom cover 10c and the shape of the fixed body 21, the movement frame 22 may be provided outside the fixed body 21 (specifically, the main fixed body 21a) so as not to be directly brought into contact with the above-described components and the fixed body 21. For example, the height of the first frame 221 from the ground may be different from the heights of the second frame 222 to the fourth frame 224 from the ground. As described below with reference to FIG. 6, the first frame 221 may be located above the main fixed body 21a and the second to fourth frames 222 to 224 may be provided at the front and both lateral sides of the main fixed body 21a. Therefore, the height of the first frame 221 from the ground may be greater than the heights of the second to fourth frames 222 to 224 from the ground.

In this case, the movement frame 22 may include a fifth frame 225 for connecting the first frame 221 and the third frame 223 and a sixth frame 226 for connecting the first frame 221 and the fourth frame 224. In this case, the movement frame 22 may have an "L" shape when viewed from one lateral side.

As in the embodiment shown in FIG. 5, when the movement frame 22 includes first to sixth frames 221 to 226, the first frame 221 may be fastened to the fifth frame 225 and the sixth frame 226, and the second frame 222 may be fastened to the third frame 223 and the fourth frame 224. The third frame 223 may be fastened to the second frame 222 and the fifth frame 225, and the fourth frame 224 may be fastened to the second frame 222 and the sixth frame 226.

In some embodiments, the bottom cover 10c may be formed such that the front side thereof protrudes as compared to the rear and both lateral sides thereof, in order to protect the side brush 15 or the suction module 27 provided at the front lower end of the fixed body 21 or to more efficiently protect the internal components upon colliding with a front obstacle. Therefore, the front side of the bottom cover 10c and the second frame 222 may be spaced apart from each other by a predetermined distance or more. In order to efficiently fasten the front side of the bottom cover 10c and the movement frame 22, the movement frame 22 may further include a seventh frame 227 formed at the front side of the second frame 222.

The movement frame 22 may be fastened to at least one fastening point of the bottom cover 10c. However, each of the frames 221 to 226 of the movement frame 22 and the bottom cover 10c are spaced apart from each other by a predetermined distance, such that each of the frames 221 to 226 may not be easily fastened to the bottom cover 10c.

Therefore, the movement frame 22 may further include one or more fastening frames 223a to 223c, 224a to 224c and 227a to 227b connected to any one of the frames 221 to 226, in order to be fastened to the bottom cover 10c.

For example, the first fastening frame 223a and the second fastening frame 223b may be connected to the third frame 223 toward the lateral side (e.g., right side) of the cleaning robot 1. The third fastening frame 223c may be connected to the third frame 223 toward the rear side of the cleaning robot 1. The fourth fastening frame 224a and the fifth fastening frame 224b may be connected to the fourth frame 224 toward the lateral side (e.g., left side) of the cleaning body 1, and the sixth fastening frame 224c may be connected to the fourth frame 224 toward the rear side of the cleaning robot 1. In addition, the seventh fastening frame 227a and the eighth fastening frame 227b may be connected to the seventh frame 227 toward the front side of the cleaning robot 1.

Meanwhile, the fastening frames may be formed at positions symmetrical to each other with respect to a virtual line connecting the front and rear sides of the cleaning robot 1. That is, the first fastening frame 223a and the fourth fastening frame 224a, the second fastening frame 223b and the fifth fastening frame 224b, the third fastening frame 223c and the sixth fastening frame 224c, and the seventh fastening frame 227a and the eighth fastening frame 227b may be formed at positions symmetrical to each other.

The movement frame 22 may be connected to the bottom cover 10c as the plurality of fastening frames 223a to 223c, 224a to 224c and 227a to 227b is fastened to the bottom cover 10c. An example of fastening the fastening frames 223a to 223c, 224a to 224c and 227a to 227b to the bottom cover 10c was described with reference FIG. 3.

Referring to FIGS. 5 and 6, the cleaning robot 1 may include one or more elasticity setting parts 23a to 23c connected to the movement frame 22. As shown in FIG. 5, the elasticity setting part may include a first elasticity setting part 23a connected to the second frame 222 and a second elasticity setting part 23b and a third elasticity setting part 23c connected to the first frame 221.

For example, the elasticity setting parts 23a to 23c may be provided in an acute-angled triangular shape and may be fixed to the fixed body 21 by a first plate 211, to which the second elasticity setting part 23b and the third elasticity setting part 23c are fastened, and a second plate 212, to which the first elasticity setting part 23a is fastened. In some embodiments, the first plate 211 and the second plate 212 may be understood as being included in the fixed body 21. For example, the first plate 211 may be fastened to the main fixed body 21a and the second plate 212 may be fastened to the front fixed body 21d. In this case, the first elasticity setting part 23a may be provided at the front side of the fixed body 21 (specifically, the main fixed body 21a), and the second elasticity setting part 23b and the third elasticity setting part 23c may be provided above the main fixed body 21a to form the acute-angled triangle along with the first elasticity setting part 23a. As a result, the movement frame 22 is connected and supported at three points located in the acute-angled triangular shape of the fixed body 21, thereby stably supporting the cover 10 having a large volume and weight relative to the fixed body 21.

In addition, the elasticity setting parts 23a to 23c may enable the movement frame 22 to freely move relative to the fixed body 21. Therefore, even when the cover 10 and the movement frame 22 move by external force, the fixed body 21 may not move. To this end, the elasticity setting parts 23a to 23c may be connected to the movement frame 22 using an elastic member. This will be described in greater detail below with reference to FIG. 7. Meanwhile, as shown in FIG. 6, the movement frame 22 may be located outside the fixed body 21 (specifically, the main fixed body 21a) in order to avoid direct contact with the fixed body 21 upon movement. In particular, the movement frame 22 and the fixed body 21 may be spaced apart from each other by greater than a predetermined distance and the predetermined distance may correspond to a maximum movement distance of the movement frame 22 and the cover 10.

Figure 7:
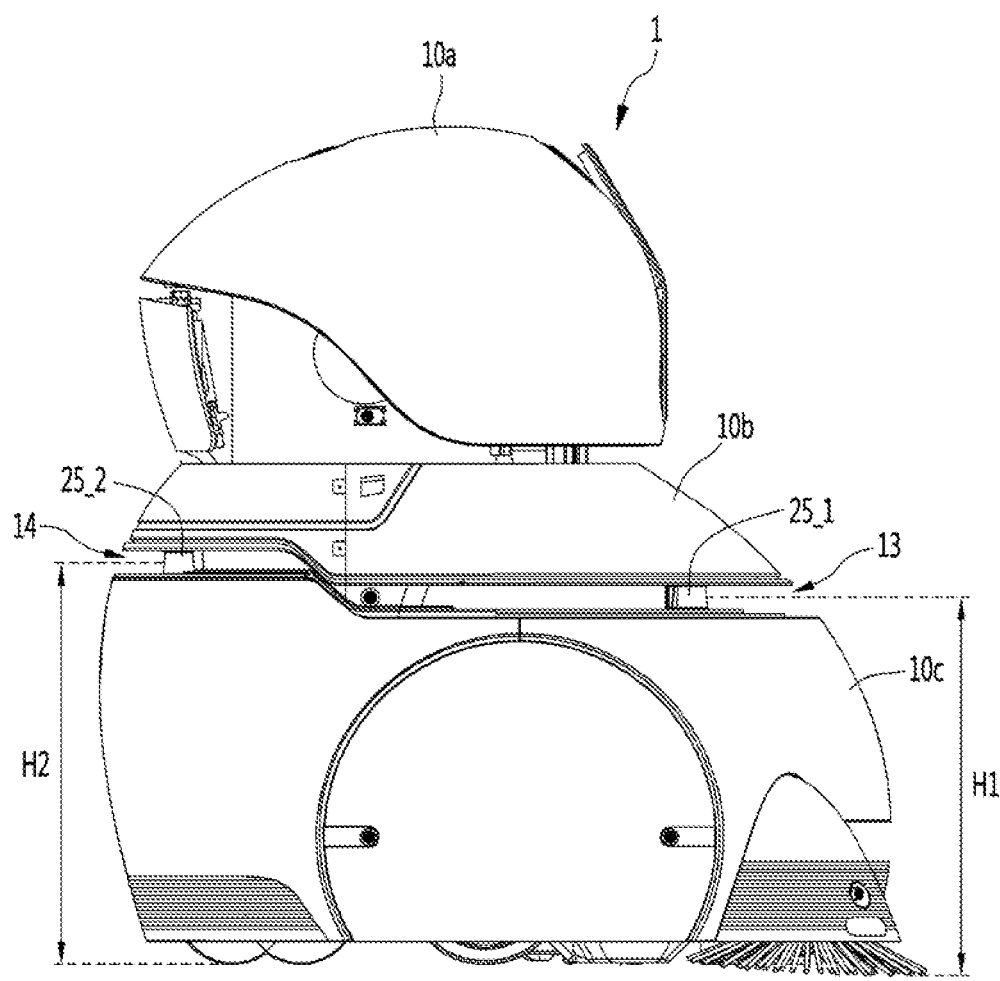
FIG. 7 is a side view of a cleaning robot according to an embodiment of the present invention.

FIG. 7 is a side view of a cleaning robot according to an embodiment of the present invention.

Referring to FIG. 7, the cleaning robot 1 may include a first lidar sensor 25_1 provided at a front side of the cleaning robot 1 and a second lidar robot 25_2 provided at a rear side of the cleaning robot 1. Using the first lidar sensor 25_1 and the second lidar sensor 25_2, the cleaning robot 1 may sense an obstacle located in all direction of the cleaning robot 1. In addition, the cleaning robot 1 may sense an object (e.g., a wall, a structure having a specific shape, etc.) located in all direction using the first lidar sensor 25_1 and the second lidar sensor 25_2, thereby sensing the current position of the cleaning robot. To this end, the sum of the sensing angle range of the first lidar sensor 25_1 and the sensing angle range of the second lidar sensor 25_2 may be equal to or greater than 360°.

The first recessed part 13 and the second recessed part 14 may be formed to horizontally expose the first lidar sensor 25_1 and the second lidar sensor 25_2 provided in the main body 20. In this case, the height H1 of the first recessed part 13 and the height H2 of the second recessed part 14 may be different from each other. Since the heights of the first recessed part 13 and the second recessed part 14 are different, a phenomenon that the lidar sensor 25_1 or 25_2 erroneously senses an obstacle by receiving laser light emitted from the lidar sensors of another cleaning robot can be reduced.

The lidar sensors 25_1 and 25_2 may emit laser light having high straightness to sense an obstacle or the current position of the cleaning robot. That is, the width of the first recessed part 13 and the second recessed part 14 may be set such that the lidar sensors 25_1 and 25_2 horizontally emit laser light. For example, the width may be 4 cm. That is, the first recessed part 13 and the second recessed part 14 minimally expose the lidar sensors 25_1 and 25_2, thereby preventing the lidar sensors 25_1 and 25_2 from being damaged or broken.

The first lidar sensor 25_1 may sense an obstacle or an object located in an angle range (e.g., 270°) exceeding 180° with respect to the front side of the cleaning robot 1. To this end, the first recessed part 13 may be formed such that the first lidar sensor 25_1 emits laser light in an angle range exceeding 180°. That is, the first recessed part 13 may horizontally extend from the front side to both lateral sides of the cleaning robot 1. In addition, since the first lidar sensor 25_1 is located at a predetermined distance inward from the front side of the bottom cover 10c, the first recessed part 13 may horizontally extend to the rear side of the side surface of the bottom cover beyond the center of the side surface of the bottom cover 10c.

Meanwhile, the second lidar sensor 25_2 may have an angle range (e.g., 180°) less than that of the first lidar sensor 25_1. In addition, since the second lidar sensor 25_2 is located further outside the cleaning robot 1 than the first lidar sensor 25_1, the second recessed part 13 may horizontally extend from the rear surface of the bottom cover 10c not to pass the center of the side surface.

Figure 8:
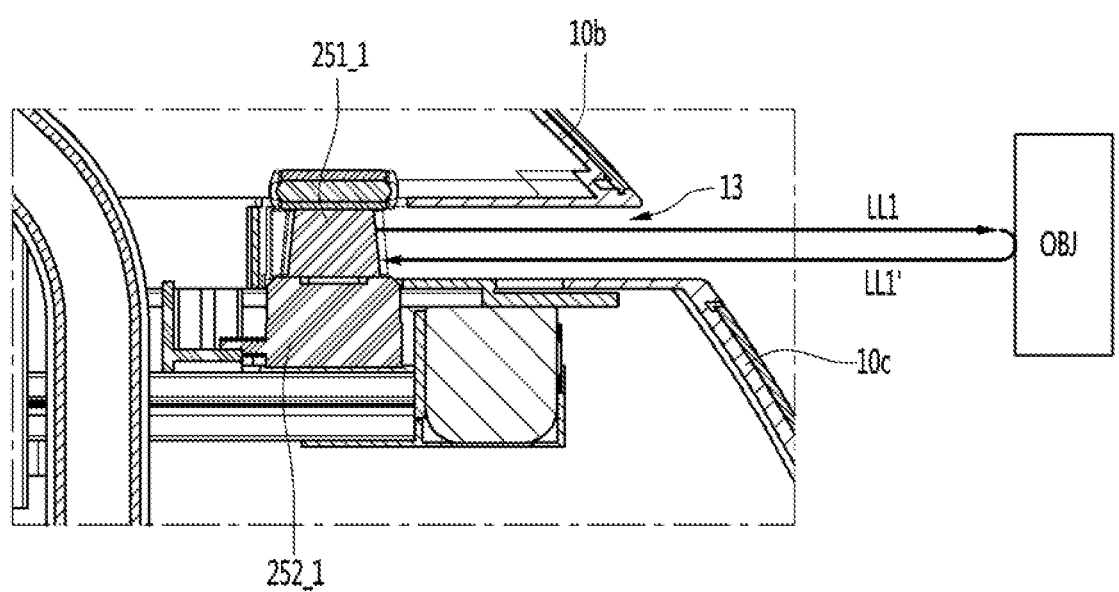
FIG. 8 is a diagram showing a lidar sensor provided at a front side of a cleaning robot according to an embodiment of the present invention.

FIG. 8 is a diagram showing a lidar sensor provided at a front side of a cleaning robot according to an embodiment of the present invention.

Referring to FIG. 8, the first lidar sensor 25_1 may emit laser light LL1 and receive reflected laser light LL1' reflecting from an object OBJ.

To this end, the first lidar sensor 25_1 may include a reflector module 251_1 including a reflector and a sensing module 252_1 including various components such as a laser emitting unit for emitting laser light and a laser receiving unit for receiving reflected laser light.

Laser light LL1 vertically emitted from the laser emitting unit to the reflector module 251_1 may be refracted through the reflector included in the reflector module 251_1 to be horizontally emitted. The reflected laser light LL1' reflecting from the object OBJ may be refracted through the reflector to be received by the laser receiving unit of the sensing module 252_1. The first lidar sensor 25_1 may sense a distance from the object OBJ based on the emission time of the laser light LL1 and the reception time of the reflected laser light LL1'.

The reflector included in the reflector module 251_1 may horizontally rotate or oscillate around a vertical axis. Laser light LL1 may be emitted at various angles according to the rotation or oscillation angle of the reflector. For example, if it is assumed that the rotation or oscillation angle range of the reflector is 270°, the first lidar sensor 25_1 may sense the distance from the object located in an angle range of 135° from the front side of the cleaning robot 1 in a left direction and 135° from the front side of the cleaning robot 1 in a right direction.

Referring to FIG. 8 continuously, the first lidar sensor 25_1 may be connected to the fixed body 21 provided in the bottom cover 10c. The first recessed part 13 may be formed above the bottom cover 10c. The first recessed part 13 may be recessed to include a position where the first lidar sensor 25_1 is located from the circumference of the cover 10. Accordingly, the first lidar sensor 25_1 may be horizontally exposed by the first recessed part 13. An upper portion of the bottom cover 10c may be partially placed inward below the first recessed pat 13. That is, the first lidar sensor 25_1 may be close to the upper portion of the bottom cover 10c.

As described above with reference to FIGS. 1 and 2, the bottom cover 10c included in the cleaning robot 1 according to the embodiment of the present invention may move by external force, thereby serving as a bumper. In contrast, since the first lidar sensor 25_1 provided in the fixed body 21 does not move or minimally moves by external force, the upper portion of the bottom cover 10c may be brought into contact with the first lidar sensor 25_1. As the bottom cover 10c is brought into contact with the first lidar sensor 25_1, the first lidar sensor 25_1 may be damaged or broken, thereby performing incorrect operation.

Hereinafter, an embodiment of a structure for protecting the first lidar sensor 25_1 from collision with the bottom cover 10c will be described with reference to FIGS. 9 and 10.

Figure 9:
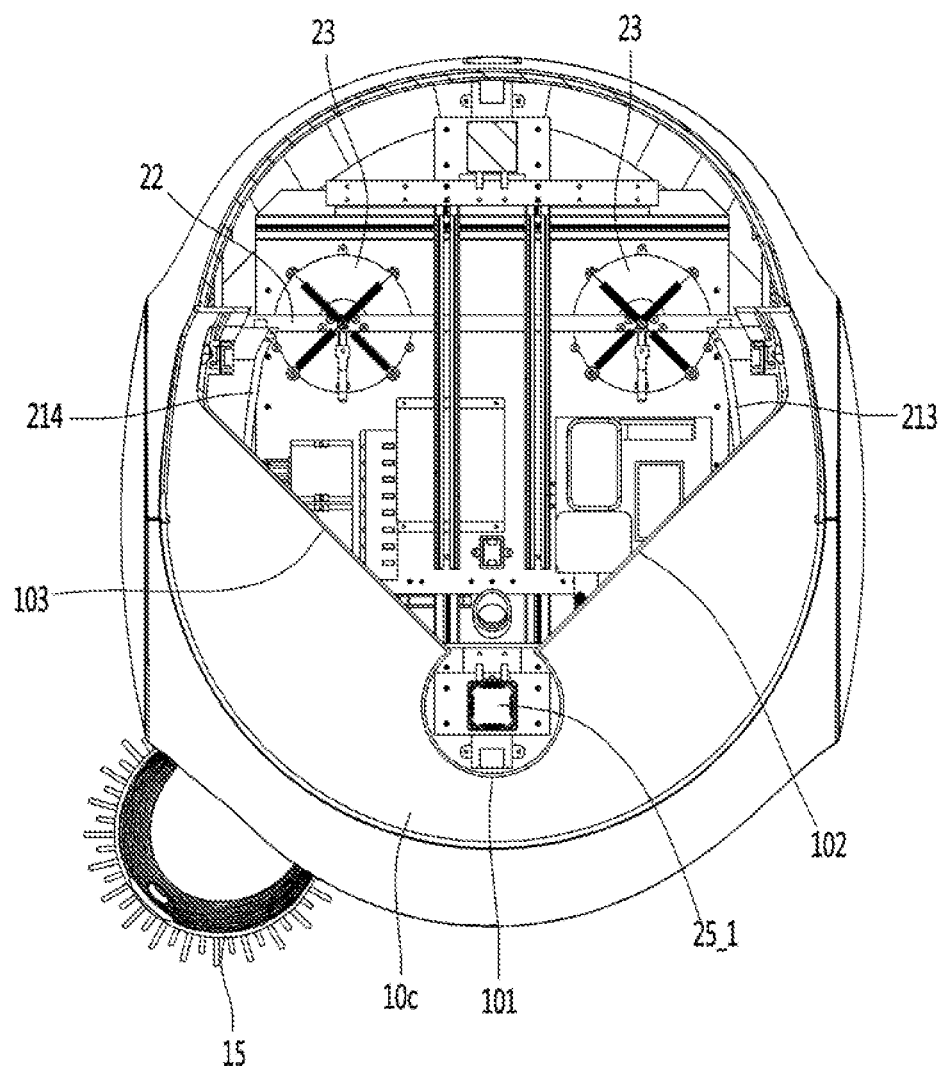
FIGS. 9 and 10 are diagrams illustrating a structure for protecting a lidar sensor provided at a front side of a cleaning robot when external force is applied to the cleaning robot.
Figure 10:
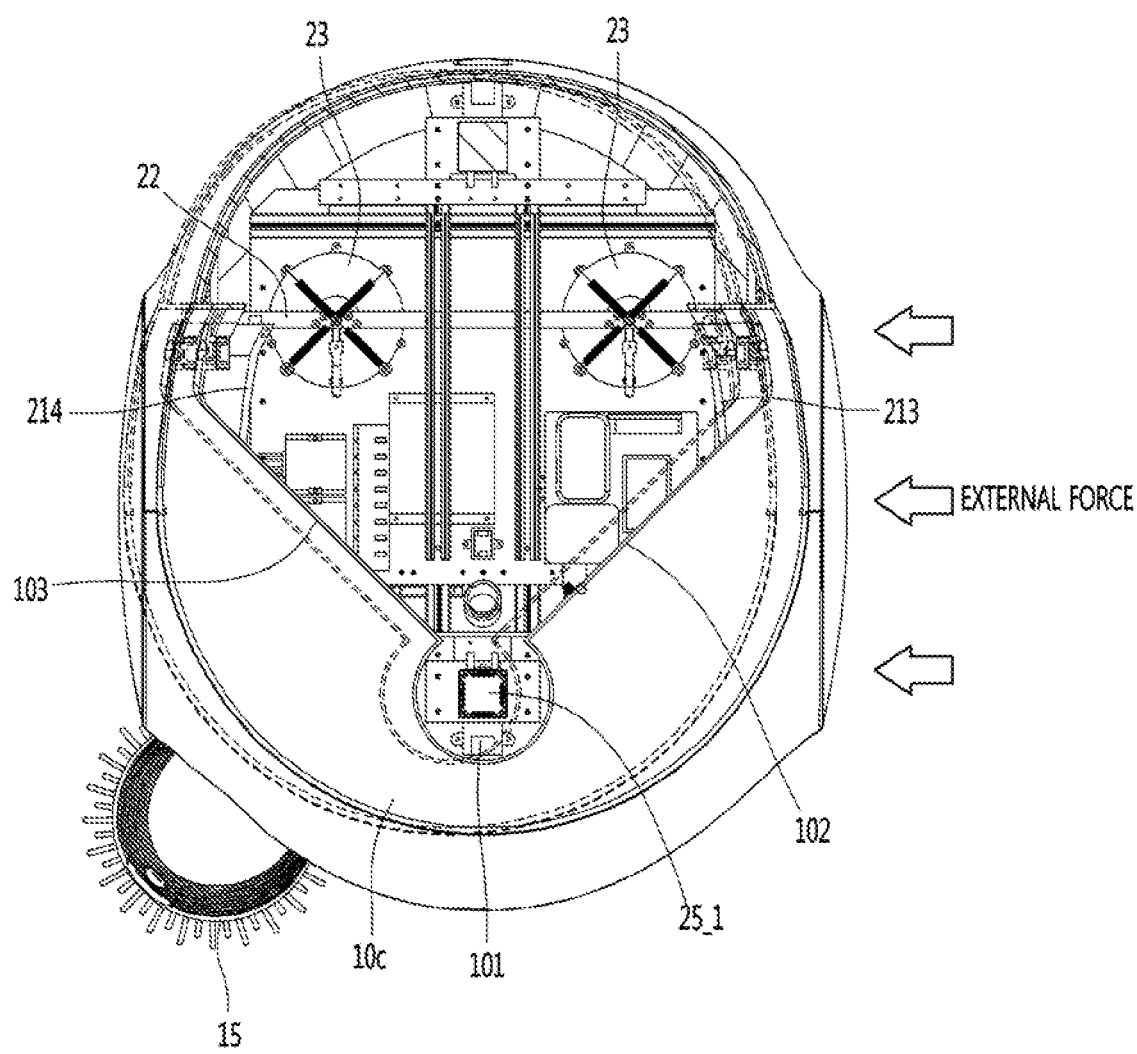

FIGS. 9 and 10 are diagrams illustrating a structure for protecting a lidar sensor provided at a front side of a cleaning robot when external force is applied to the cleaning robot. Specifically, FIGS. 9 and 10 are horizontal cross-sectional views of the cleaning robot 1 at the height H1 of the first lidar sensor 25_1.

Referring to FIG. 9, the first lidar sensor 25_1 may be connected to the fixed body 21 in a state of being exposed. For example, as shown in FIGS. 7 and 8, the first lidar sensor 25_1 may be exposed through the first recessed part 13. In addition, an opening 101 for exposing the first lidar sensor 25_1 connected to the fixed body 21 through the first recessed part 13 may be formed below the first recessed part 13. Specifically, the opening 101 (or first opening) may be formed in the upper portion of the bottom cover 10c. That is, the first lidar sensor 25_1 may be located between the top cover 10a and the bottom cover 10c through the first recessed part 13 and an opening 101, and may be externally exposed between the top cover 10a and the bottom cover 10c.

As described above with reference to FIGS. 1 and 2, the bottom cover 10c according to the embodiment of the present invention may serve as a bumper. That is, when external force is applied due to collision with an obstacle, the bottom cover 10c may move by the applied external force but the fixed body 21 may not move. In this case, the first lidar sensor 25_1 connected to the fixed body 21 and externally exposed through the first recessed part 13 and the opening 101 may collide with the upper portion of the bottom cover 10c, thereby being damaged or broken. Specifically, when the bottom cover 10c moves by external force, the opening 101 may also move. In this case, the upper portion of the bottom cover 10c corresponding to the circumference of the opening 101 may collide with the first lidar sensor 25_1 and the first lidar sensor 25_1 may be damaged or broken by collision.

According to the embodiment of the present invention, in order to prevent collision between the first lidar sensor 25_1 and the bottom cover 10c, the opening 101 formed below the first recessed part 13 may have a size sufficient to prevent collision of the first lidar sensor 25_1 even when the bottom cover 10c moves. For example, the opening 101 may have a circular shape without being limited thereto. The first lidar sensor 25_1 may be located in the opening 101. At this time, a distance between the circumference of the opening 101 and the first lidar sensor 25_1 may be equal to or greater than a maximum movement distance of the bottom cover 10c. Accordingly, even when the bottom cover 10c moves by the maximum distance due to external force, the circumference of the opening 101 and the first lidar sensor 25_1 do not collide with each other.

In some embodiments, the fixed body 21 may further include cover stoppers 213 and 214 for restricting the maximum movement distance of the bottom cover 10c when the bottom cover 10c moves by external force. The cover stoppers 213 and 214 may be set to the fixed body 21 to be spaced apart from the bottom cover 10c by the maximum movement distance. When the bottom cover 10c moves by the maximum movement distance due to external force, the bottom cover 10c and the cover stoppers 213 and 214 are brought into contact with each other and the bottom cover 10c cannot move by greater than the maximum movement distance.

For example, the maximum movement distance restricted by the cover stoppers 213 and 214 may be less than the distance between the circumference of the opening 101 and the first lidar sensor 25_1. Therefore, even when external force applied to the bottom cover 10c is large, since the movement distance of the bottom cover 10c is restricted by the cover stoppers 211 and 212, collision between the bottom cover 10c and the first lidar sensor 25_1 is prevented.

Referring to the embodiment shown in FIG. 10, when external force is applied from one side of the cleaning robot 1, the bottom cover 10c may move to the other side. At this time, even when the bottom cover 10c moves to the other side by the maximum movement distance due to external force, the circumference of the opening 101 formed in the first recessed part 13 does not collide with the first lidar sensor 25_1.

In addition, if the fixed body 21 includes the cover stoppers 213 and 214, since the bottom cover 10c moves to the other side, an inner wall 102 of the first recessed part 13 may be brought into contact with the cover stopper 213. When the inner wall 102 and the cover stopper 213 are brought into contact with each other, the bottom cover 10c may no longer move to the other side by the cover stopper 213. Therefore, the circumference of the opening 101 may not collide with the first lidar sensor 25_1. The inner wall 102 may be connected to the upper portion of the bottom cover 10c and have a predetermined height.

The embodiments shown in FIGS. 9 and 10 will now be described in another manner. In some embodiments, an opening part for partially opening the upper portion of the fixed body 21 may be formed in the upper portion of the bottom cover 10c. Therefore, the first lidar sensor 25_1 provided in the fixed body 21 may be exposed through the opening part of the bottom cover 10c. The opening part may include an opening 101 formed around the first lidar sensor 25_1 to externally expose the first lidar sensor 25_1. When the bottom cover 10c moves by external force, the opening-part outer portions 102 and 103 may be brought into contact with the cover stoppers 213 and 214 provided in the fixed body 21. The cover stoppers 213 and 214 may be spaced apart from the opening-part outer portions 102 and 103 by a predetermined distance. As the opening-part outer portions 102 and 103 are brought into contact with the cover stoppers 213 and 214, the bottom cover 10c no longer moves. That is, the maximum movement distance of the bottom cover 10c may correspond to the predetermined distance between the opening-part outer portions 102 and 103 and the cover stoppers 213 and 214. In this case, the distance between the first lidar sensor 25_1 and the opening 101 formed around the first lidar sensor 25_1 may be greater than the maximum movement distance. Therefore, the opening-part outer portions 102 and 103 may not be brought into contact with the first lidar sensor 25_1.

In some embodiments, the maximum movement distance of the bottom cover 10c may be restricted by the elasticity setting part 23 provided between the fixed body 21 and the movement frame 22 fastened to the bottom cover 10c. This will be described with reference to FIGS. 11 and 12.

Figure 11:
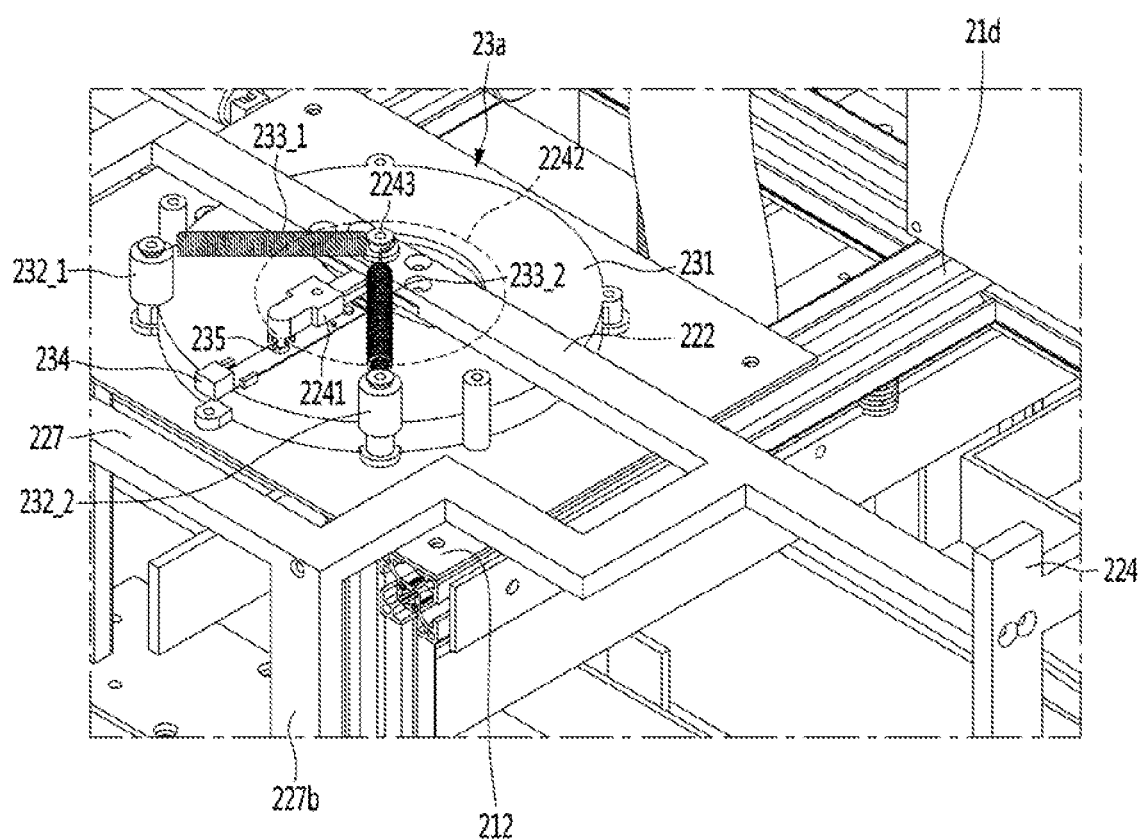
FIG. 11 is a perspective view showing an elasticity setting part provided between a movement frame and a fixed body of a cleaning robot according to an embodiment of the present invention.

FIG. 11 is a perspective view showing an elasticity setting part provided between a movement frame and a fixed body of a cleaning robot according to an embodiment of the present invention, and FIG. 9 is a plan view of the elasticity setting part shown in FIG. 8.

Figure 12:
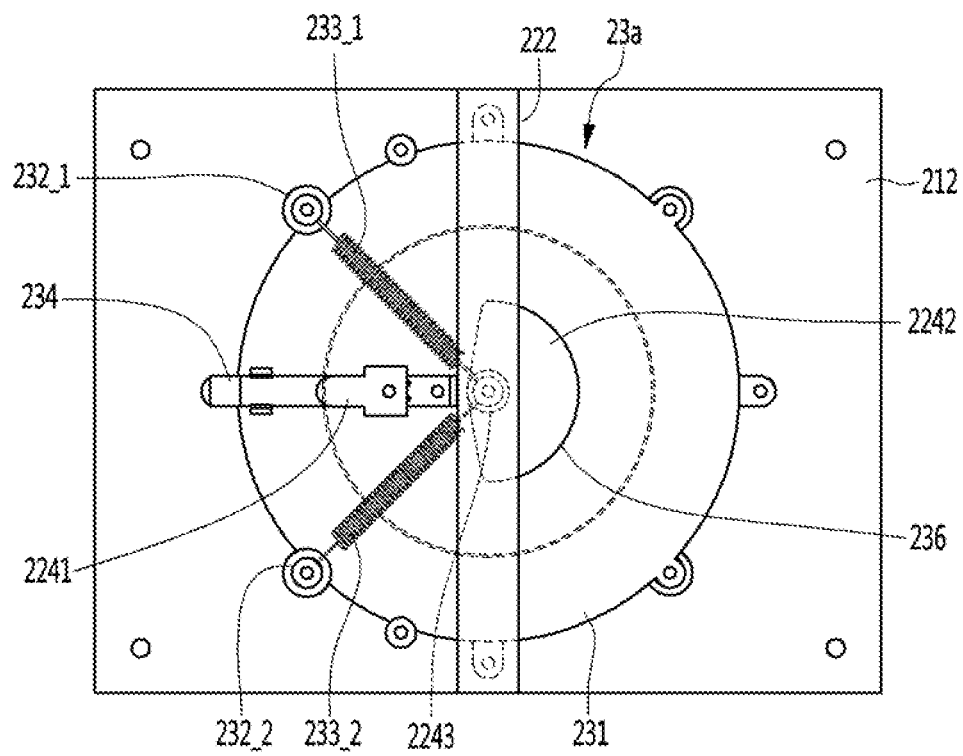
FIG. 12 is a plan view of the elasticity setting part shown in FIG. 11.

In FIGS. 11 and 12, the configuration of the elasticity setting part 23 according to the embodiment of the present invention will be described using the first elasticity setting part 23a provided at the front side of the fixed body 21. However, the configuration of the elasticity setting parts 23b and 23c provided at the lateral rear sides of the fixed body 21 is substantially equal to that of the first elasticity setting part 23a provided at the front side of the fixed body 21.

Referring to FIG. 11, the movement frame 22 (the second frame 222 in the embodiment of FIG. 11) may be in contact with the upper surface of the second plate 212 fastened to the front fixed body 21d and may be connected to an inner body 2242 and movably supporting the movement frame 22 relative to the fixed body 21. For example, the inner body 2242 may be implemented in a circular plate shape, without being limited thereto. The inner body 2242 may be located below the second frame 222. The inner body 2242 may be connected to the second frame 222 through a movement shaft 2243 vertically formed with respect to the second frame 222. That is, the movement shaft 2243 may connect the movement frame 22 and the inner body 2242. In this case, when the movement frame 22 moves by external force applied to the cover 10, the inner body 2242 may also move in a horizontal direction.

The first elasticity setting part 23a may include a holder 231 for enabling horizontal movement of the movement frame 22 and disabling vertical movement of the movement frame 22. The holder 231 may be fastened to the second plate 212 of the fixed body 21. A reception space for receiving the inner body 2242 may be formed in the holder 231, and the inner body 2242 may be horizontally moved in the reception space. In order for the inner body 2242 to move in the reception space, the size of the reception space may be greater than that of the inner body 2242.

Referring to FIG. 12, a movement-shaft stopper 236 for connecting the inner body 2242 received in the reception space with the movement frame 22 through the movement shaft 2243 may be formed at the upper portion of the holder 231. For example, the movement shaft stopper 236 may have a fan shape. The central angle of the fan-shaped stopper is less than 180° and the arc of the fan-shaped stopper may correspond to a minor arc. At this time, in order to prevent the inner body 2242 from escaping from the holder 231, the size of the movement-shaft stopper 236 may be less than that of the inner body 2242. The movement-shaft stopper 236 may be formed to fix the movement frame 22 at a reference position when external force is not applied. In addition, the movement ranges of the bottom cover 10c and the movement frame 22 may be set according to the size of the movement-shaft stopper 236. As the size of the movement-shaft stopper 236 increases, the movement range of the movement frame 22 may increase and, as the size of the movement-shaft stopper 236 decreases, the movement range of the movement frame 22 may decrease.

In some embodiments, the movement ranges of the movement frame 22 and the bottom cover 10c may be set according to the size of the reception space. As the size of the reception space increases, the movement ranges of the bottom cover 10c and the movement frame 22 may increase and, as the size of the reception space decreases, the movement ranges of the bottom cover 10c and the movement frame 22 may decrease.

In addition, the first elasticity setting part 23a may further include elastic members 233_1 to 233_2 provided between holder 231 and the second frame 222. One ends of the elastic members 233_1 to 233_2 may be connected to spring connection bodies 232_1 and 232_2 coupled to the holder 231 or the edge of the holder 231, and the other ends thereof may be connected to the second frame 222 or the movement shaft 2243 connected to the second frame 222.

The elastic members 233_1 to 233_2 may be returned to the reference position after the movement frame 22 moves by external force. As the movement frame 22 is returned to the reference position, the cover 10 may also be returned to the reference position. For example, the elastic members 233_1 to 233_2 may be implemented by tension springs. The reference position may be formed by the movement-shaft stopper 236.

Although the elasticity setting part 23 includes two elastic members 233_1 to 233_2 in FIGS. 11 and 12, the number of elastic members may be changed according to embodiment. In addition, the elastic member may be implemented by various components (e.g., a damper, etc.) for returning the movement frame 22 to a specific position instead of the tension spring.

That is, the maximum movement distance of the bottom cover 10c may be restricted by the elasticity setting parts 23. Specifically, the maximum movement distance may be restricted by the movement-shaft stopper 236 formed at the upper portion of the holder 231 of the elasticity setting part 23. Alternatively, the maximum movement distance may be restricted by the size of the reception space formed in the holder 231.

In some embodiments, the elasticity setting part 23a may further include a sensor module 234 for sensing movement of the bottom cover 10c. For example, the sensor module 234 may include a Hall sensor 235. The Hall sensor means a sensor for sensing change in magnetic field using the Hall effect. In this case, the movement frame 22 may be connected to a magnet fixing part 2241 for fixing a magnet (not shown) for generating a magnetic field. As the magnet (not shown) moves, the magnetic field is changed. The sensor 235 may sense change in magnetic field, thereby sensing movement of the bottom cover 10c.

Figure 13:
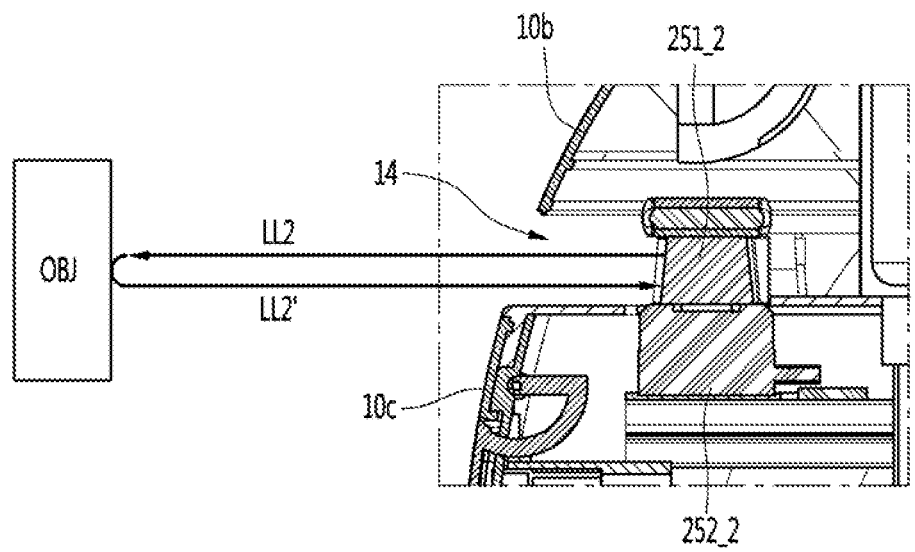
FIG. 13 is a diagram showing a lidar sensor provided at a rear side of a cleaning robot according to an embodiment of the present invention.

FIG. 13 is a diagram showing a lidar sensor provided at a rear side of a cleaning robot according to an embodiment of the present invention.

Referring to FIG. 13, similarly to the first lidar sensor 25_1 described above with reference to FIG. 8, the second lidar sensor 25_2 may include a reflector module 251_2 and a sensing module 252-2. Laser light LL2 vertically emitted from the laser emitting unit to the reflector module 251_2 may be refracted through the reflector included in the reflector module 251_2 to be horizontally emitted. The reflected laser light LL2' reflecting from the object OBJ may be refracted through the reflector to be received by the laser receiving unit of the sensing module 252_2. The second lidar sensor 25_2 may sense a distance from the object OBJ based on the emission time of the laser light LL2 and the reception time of the reflected laser light LL2'.

The reflector included in the reflector module 251_2 may horizontally rotate or oscillate around a vertical axis. Laser light LL2 may be emitted at various angles according to the rotation or oscillation angle of the reflector. For example, if it is assumed that the rotation or oscillation angle range of the reflector is 180°, the second lidar sensor 25_2 may sense the distance from the object located in an angle range of 90° from the rear side of the cleaning robot 1 in a left direction and 90° from the rear side of the cleaning robot 1 in a right direction.

That is, the cleaning robot 1 may sense the distance from the obstacle or object located in the front direction of the cleaning robot 1 using the first lidar sensor 25_1 and the second lidar sensor 25_2. Based on the sensed result, the cleaning robot 1 may sense a peripheral obstacle or the current position thereof Referring to FIG. 13 continuously, the second lidar sensor 25_2 may be connected to the fixed body 21 provided in the bottom cover 10c. The second recessed part 14 may be formed above the bottom cover 10c. The second recessed part 14 may be recessed to include a position where second lidar sensor 25_2 is located from the outer portion of the cover 10. Accordingly, the second lidar sensor 25_2 may be horizontally exposed by the second recessed part 14. An upper portion of the bottom cover 10c may be partially placed inward below the second recessed part 14. That is, the second lidar sensor 25_2 may be close to the upper portion of the bottom cover 10c.

As described above with reference to FIGS. 1 and 2, the bottom cover 10c included in the cleaning robot 1 according to the embodiment of the present invention may move by external force, thereby serving as a bumper. In contrast, since the second lidar sensor 25_2 provided in the fixed body 21 does not move or minimally moves by external force, the upper portion of the bottom cover 10c may be brought into contact with the second lidar sensor 25_2. As the bottom cover 10c is brought into contact with the second lidar sensor 25_2, the second lidar sensor 25_2 may be damaged or broken, thereby performing incorrect operation.

Figure 14:
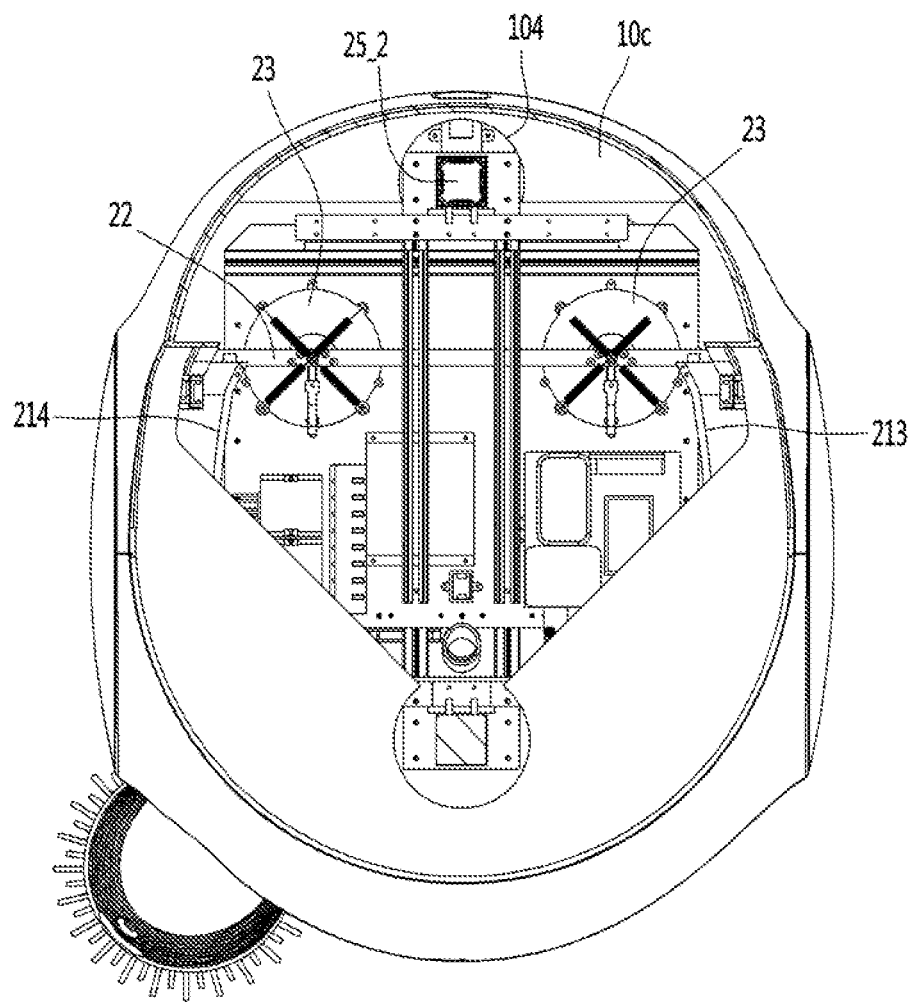
FIGS. 14 and 15 are diagrams illustrating a structure for protecting a lidar sensor provided at a rear side of a cleaning robot when external force is applied to the cleaning robot.
Figure 15:
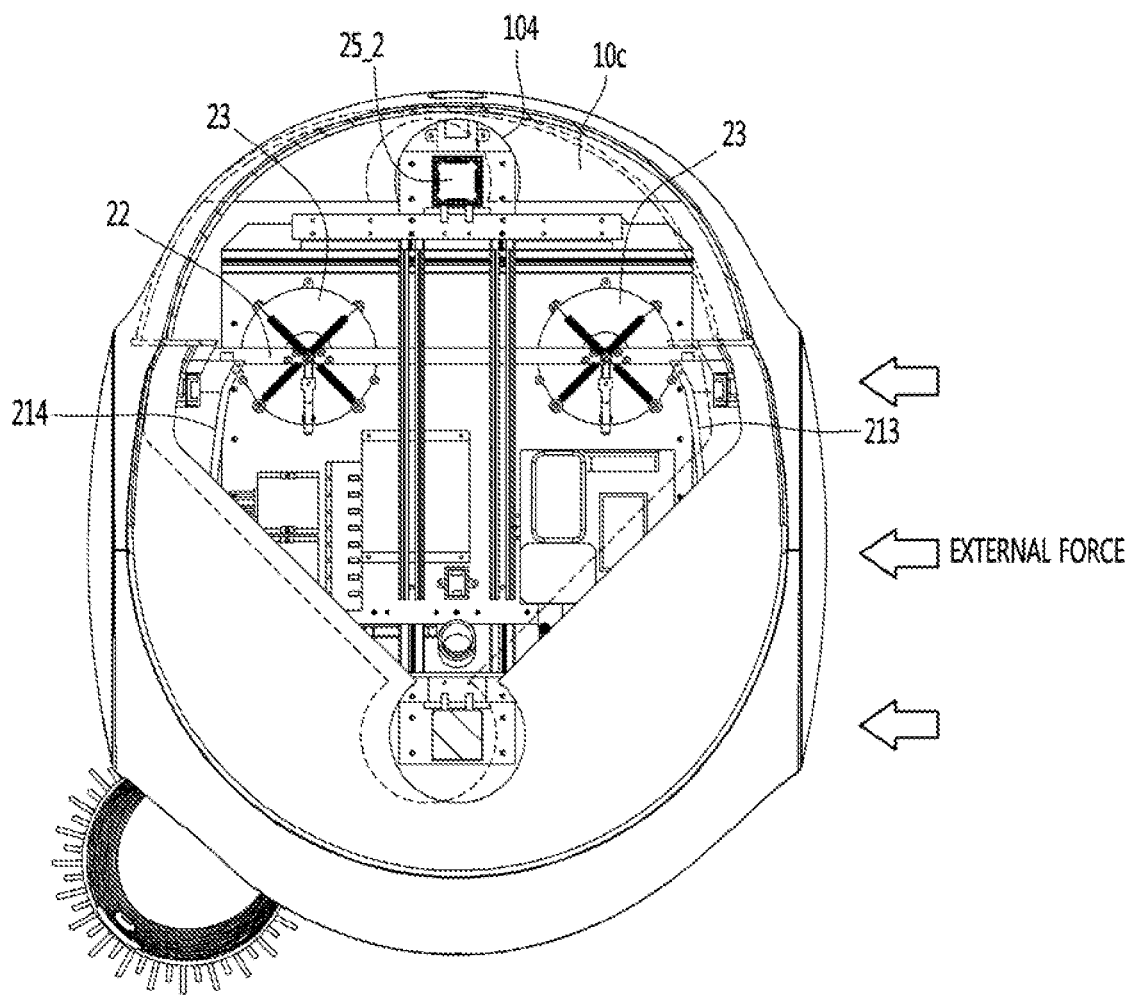

FIGS. 14 and 15 are diagrams illustrating a structure for protecting a lidar sensor provided at a rear side of a cleaning robot when external force is applied to the cleaning robot. Specifically, FIGS. 14 and 15 are horizontal cross-sectional views of the cleaning robot 1 at the height H2 of the second lidar sensor 25_2 in FIG. 7.

Referring to FIG. 14, similarly to the first lidar sensor 25_1 shown in FIG. 9, the second lidar sensor 25_2 may be connected to the fixed body 21 in a state of being exposed. For example, as shown in FIGS. 7 and 13, the second lidar sensor 25_2 may be externally exposed through the second recessed part 14. In addition, an opening 104 (or second opening) for exposing the second lidar sensor 25_2 connected to the fixed body 21 through the second recessed part 14 may be formed below the second recessed part 14. Specifically, the opening 104 may be formed in the upper portion of the bottom cover 10c. That is, the second lidar sensor 25_2 may be located between the top cover 10a and the bottom cover 10c through the second recessed part 14 and an opening 104, and may be externally exposed between the top cover 10a and the bottom cover 10c.

When external force is applied due to collision with an obstacle, the bottom cover 10c may move by the applied external force but the fixed body 21 may not move. In this case, the second lidar sensor 25_2 connected to the fixed body 21 and externally exposed through the second recessed part 14 and the opening 104 may collide with the upper portion of the bottom cover 10c, thereby being damaged or broken. Specifically, when the bottom cover 10c moves by external force, the opening 104 may also move. In this case, the upper portion of the bottom cover 10c corresponding to the circumference of the opening 101 may collide with the second lidar sensor 25_2 and the second lidar sensor 25_2 may be damaged or broken by collision.

According to the embodiment of the present invention, in order to prevent collision between the second lidar sensor 25_2 and the bottom cover 10c, the opening 104 formed below the second recessed part 14 may have a size sufficient to prevent collision of the second lidar sensor 25_2 even when the bottom cover 10c moves. For example, the opening 104 may have a circular shape without being limited thereto. The second lidar sensor 25_2 may be located in the opening 104. At this time, a distance between the circumference of the opening 104 and the second lidar sensor 25_2 may be equal to or greater than a maximum movement distance of the bottom cover 10c. Accordingly, even when the bottom cover 10c moves by the maximum distance due to external force, the circumference of the opening 104 and the second lidar sensor 25_2 do not collide with each other.

In some embodiments, as described above with respect to FIG. 9, if the fixed body 21 includes the cover stoppers 213 and 214, the maximum movement distance of the bottom cover 10c restricted by the cover stoppers 213 and 214 may be less than the distance between the circumference of the opening 104 and the second lidar sensor 25_2. Therefore, even when external force applied to the bottom cover 10c is large, since the movement distance of the bottom cover 10c is restricted by the cover stoppers 213 and 214, collision between the bottom cover 10c and the second lidar sensor 25_2 is prevented.

In some embodiments, the maximum movement distance of the bottom cover 10c may be restricted by the elasticity setting part 23. This was described above with reference to FIGS. 11 and 12.

Referring to the embodiment shown in FIG. 15, when external force is applied from one side of the cleaning robot 1, the bottom cover 10c may move to the other side. At this time, even when the bottom cover 10c moves to the other side by the maximum movement distance due to external force, the circumference of the opening 104 formed below the first recessed part 13 does not collide with the second lidar sensor 25_2.

In addition, if the fixed body 21 includes the cover stoppers 213 and 214, since the bottom cover 10c moves to the other side, an inner wall 102 of the first recessed part 13 may be brought into contact with the cover stopper 213. When the inner wall 102 and the cover stopper 213 are brought into contact with each other, the bottom cover 10c may no longer move to the other side by the cover stopper 213. Therefore, the circumference of the opening 101 may not collide with the first lidar sensor 25_1.

That is, according to the embodiment of the present invention, the cleaning robot 1 includes the first recessed part 13 and the second recessed part 14, both of which are recessed to the positions of the lidar sensors 25_1 and 25_2 connected to the fixed body 21. The lidar sensors 25_1 and 25_2 may be minimally exposed through the first recessed part 13 and the second recessed part 14. Therefore, the lidar sensors 25_1 and 25_2 can be prevented from being damaged or broken due to direct collision with an obstacle.

In addition, the cleaning robot 1 may include the openings 101 and 104, the cover stoppers 213 and 214 or the elasticity setting parts 23 for preventing collision between the lidar sensors 25_1 and 25_2 and the bottom cover 10c when the bottom cover 10c serving as a bumper moves by external force. Therefore, the bottom cover 10c can efficiently protect the externally exposed lidar sensors 25_1 and 25_2 as well as the various components from external force.

In the cleaning robot according to the embodiment of the present invention, the lidar sensor connected to the fixed body of the robot can be externally exposed through the recessed part between the top cover and the bottom cover. In particular, since laser light emitted from the lidar sensor has high straightness, the cleaning robot may include the lidar sensor which is minimally exposed in a horizontal direction between the top cover and the bottom cover. Accordingly, the lidar sensor which is more expensive than the other sensors can be prevented from being damaged or broken due to direction collision with an external obstacle, thereby minimizing cost.

In addition, in the cleaning robot, an opening for preventing collision between the lidar sensor externally exposed and the cover when the cover serving as a bumper moves by external force is formed in the cover. The lidar sensor connected to the fixed body of the cleaning robot may be externally exposed through the opening. In addition, the distance between the circumference of the opening and the lidar sensor may be equal to or greater than the maximum movement distance of the cover. That is, the opening may have a size sufficient to prevent the lidar sensor from being brought into contact with the cover. Accordingly, even when the cover moves by external force, since contact between the circumference of the opening and the lidar sensor is prevented, the lidar sensor can be prevented from being damaged or broken.

The cover stopper or the elasticity setting part for restricting the movement distance of the cover may be provided in the cleaning robot. The movement distance restricted by the cover stopper or the elasticity setting part may be less than the distance between the lidar sensor and the circumference of the opening. Accordingly, collision between the circumference of the opening and the lidar sensor can be prevented when the cover moves, thereby preventing the lidar sensor from being damaged or broken.

What is claimed is:

1. A robot comprising:
a fixed body;
a plurality of wheels provided at a lower portion of the fixed body to enable the robot to move from a first position to a second position;
a cover surrounding the fixed body, the cover being configured to move relative to the fixed body in response to an external force;
a first opening provided in a first portion of the cover; and
a first sensor connected to the fixed body and exposed externally of the cover through the first opening.

2. The robot according to claim 1, wherein the first opening is configured to avoid contact between the cover and the first sensor.

3. The robot according to claim 1, wherein an edge of the first opening is spaced apart from the first sensor by a predetermined distance, and
wherein the predetermined distance is equal to or greater than a maximum movement distance of the cover.

4. The robot according to claim 3, wherein the fixed body further includes a cover stopper spaced apart from the cover by the predetermined distance, and
wherein the cover is brought into contact with the cover stopper upon a maximum movement amount of the cover.

5. The robot according to claim 4, wherein the cover comprises a top cover and a bottom cover,
wherein a first recessed part recessed inward from a front side of the robot is provided between the top cover and the bottom cover, and
wherein the first opening is located in the bottom cover and within the first recessed part.

6. The robot according to claim 5, wherein the bottom cover further includes an inner wall located within the first recessed part, and
wherein the inner wall is brought into contact with the cover stopper according to a maximum movement amount of the bottom cover.

7. The robot according to claim 5, wherein the first recessed part extends along a front side and a portion of both lateral sides of the robot.

8. The robot according to claim 1, further comprising:
a second opening provided in an upper portion of the cover; and
a second sensor connected to the fixed body and exposed externally of the cover through the second opening,
wherein the second opening is configured to avoid contact between the cover and the second sensor.

9. The robot according to claim 8, wherein an edge of the second opening is spaced apart from the second sensor by a second distance greater than a maximum movement distance of the cover.

10. The robot according to claim 8, wherein the cover comprises a top cover and a bottom cover,
wherein a second recessed part recessed inward from a rear side of the robot is provided between the top cover and the bottom cover, and
wherein the second opening is located in the bottom cover and within the second recessed part.

11. The robot according to claim 10, wherein the second recessed part extends along a rear side to both lateral sides of the robot.

12. The robot according to claim 10, wherein the second recessed part is located at a height different from a height of a first recessed part recessed inward from a front side of the robot between the top cover and the bottom cover, and
wherein the second sensor is located at a height different from a height of the first sensor.

13. The robot according to claim 8, wherein a direction in which a center of a sensing range of the first sensor faces is opposite to a direction in which a center of a sensing range of the second sensor faces.

14. The robot according to claim 1, wherein an edge of the first opening is spaced apart from the first sensor by a first distance,
wherein the fixed body further includes a cover stopper spaced apart from the cover by a second distance,
wherein the first distance is greater than the second distance, and
whereby the cover is brought into contact with the cover stopper upon a maximum movement amount of the cover to prevent the cover from contacting the first sensor.

15. The robot according to claim 1, further comprising:
a movement frame supporting the cover, the movement frame being movable horizontally with respect to the fixed body; and
an elasticity setting part provided between the movement frame and the fixed body to support the movement frame relative to the fixed body, and to permit limited horizontal movement of the cover with respect to the fixed body,
wherein the elasticity setting part comprises:
an inner body provided below the movement frame; and
a holder providing a reception space for receiving the inner body,
wherein the inner body is movable within the reception space.

16. A robot comprising:
a fixed body;
a cover surrounding the fixed body, the cover being configured to move relative to the fixed body in response to an external force;
a first opening provided in a first portion of the cover;
a first lidar sensor connected to the fixed body and exposed externally of the cover through the first opening, the first opening having an edge spaced apart from the first lidar sensor by a first distance;
a cover stopper provided on the fixed body, the cover stopper being spaced apart from the cover by a second distance,
wherein the second distance is less than the first distance.

17. The robot according to claim 16, wherein the cover is brought into contact with the cover stopper upon a maximum movement amount of the cover to prevent the cover from contacting the first lidar sensor.

18. The robot according to claim 16, further comprising:
a second opening provided in a second portion of the cover; and
a second lidar sensor connected to the fixed body and exposed externally of the cover through the second opening, the second opening having an edge spaced apart from the second lidar sensor by a third distance,
wherein the third distance is greater than the second distance.

19. A robot comprising:
a fixed body;
a cover surrounding the fixed body, the cover being configured to move horizontally in response to an external force; and
a first sensor connected to the fixed body,
wherein a first height of a first surface of the cover from a floor surface is the same as a second height of a portion of the first sensor from the floor surface, and
wherein a horizontal distance between the first surface and the first sensor is greater than a maximum movement distance of the cover relative to the fixed body.

20. The robot according to claim 19, further comprising a second sensor connected to the fixed body,
wherein a third height of a third surface of the cover from the floor surface is the same as a fourth height of a portion of the second sensor from the floor surface,
wherein a horizontal distance between the third surface and the second sensor is greater than the maximum movement distance of the cover relative to the fixed body, and
wherein the first height and the third height are different.

* * * * *